(12) United States Patent
Girard et al.

(10) Patent No.: US 7,651,015 B2
(45) Date of Patent: Jan. 26, 2010

(54) LIQUID CONCENTRATE/EXTRACT BEVERAGE DISPENSER WITH REPLACEABLE CONCENTRATE/EXTRACT CARTRIDGE

(75) Inventors: Jeffrey J. Girard, Gilbert, AZ (US); Nasser Pirshafiey, Thousand Oaks, CA (US); Mario E. Vassaux, Scottsdale, AZ (US); Heather B. Kay, Mesa, AZ (US); Shlomo Greenwald, Ithaca, NY (US); Zipora Greenwald, Ithaca, NY (US)

(73) Assignee: Intelligent Coffee Company, LLC, Scottsdale, AZ (US)

( * ) Notice: Subject to any disclaimer, the term of this patent is extended or adjusted under 35 U.S.C. 154(b) by 814 days.

(21) Appl. No.: 11/266,695

(22) Filed: Nov. 3, 2005

(65) Prior Publication Data

US 2006/0144244 A1    Jul. 6, 2006

Related U.S. Application Data

(63) Continuation-in-part of application No. 11/209,016, filed on Aug. 22, 2005, now Pat. No. 7,578,419, and a continuation-in-part of application No. 11/055,832, filed on Feb. 11, 2005, and a continuation-in-part of application No. 11/055,915, filed on Feb. 11, 2005.

(60) Provisional application No. 60/642,311, filed on Jan. 7, 2005, provisional application No. 60/620,251, filed on Oct. 19, 2004, provisional application No. 60/544,379, filed on Feb. 13, 2004, provisional application No. 60/770,824, filed on Jul. 20, 2005, provisional application No. 60/682,107, filed on May 18, 2005, provisional application No. 60/642,311, filed on Jan. 7, 2005.

(51) Int. Cl.
| | |
|---|---|
| B22D 41/00 | (2006.01) |
| B67D 3/00 | (2006.01) |
| B67D 5/08 | (2006.01) |
| B65D 35/56 | (2006.01) |

(52) U.S. Cl. .......................... 222/509; 222/54; 222/63; 222/105; 222/129.3; 222/333; 222/504

(58) Field of Classification Search .................. 222/52, 222/63, 105, 129.3, 246, 333, 504, 509
See application file for complete search history.

(56) References Cited

U.S. PATENT DOCUMENTS 2,254,833 A    9/1941    Ashkenaz (Continued)

FOREIGN PATENT DOCUMENTS

DE    2921579    12/1980

(Continued)

*Primary Examiner*—Kevin P Shaver
*Assistant Examiner*—Melvin A Cartagena
(74) *Attorney, Agent, or Firm*—Volpe and Koenig, P.C.

(57) ABSTRACT

A concentrate/extract cartridge for a beverage dispenser for dispensing a liquid concentrate/extract and a diluent is provided. The cartridge includes a hollow body and a dispensing tube connected to the hollow body. A piston is slideably contained by the dispensing tube. The cartridge includes a valve having a valve stem that passes through a port of a valve seat connected to the dispensing tube. The port defines a flow passage through the dispensing tube. The valve stem is connected to the piston at a first end of the valve stem, and a valve body is located at a second end of the valve stem in removable contact with the valve seat for alternately opening and closing the port. A beverage dispenser having a removably insertable concentrate/extract cartridge and a method of dispensing a beverage made from concentrate/extract and a diluent are also provided.

3 Claims, 20 Drawing Sheets

U.S. PATENT DOCUMENTS

| | | | |
|---|---|---|---|
| 2,554,570 A | 5/1951 | Harvey | |
| 2,887,255 A | 5/1959 | Baurlein | |
| 2,979,231 A | 4/1961 | Witherspoon, Jr. | |
| 3,258,166 A | 6/1966 | Kückens | |
| 3,828,985 A | 8/1974 | Schindler | |
| 4,011,969 A * | 3/1977 | Martin | 222/196 |
| 4,096,893 A | 6/1978 | Harvey, Jr. et al. | |
| 4,164,964 A | 8/1979 | Daniels | |
| 4,334,640 A | 6/1982 | van Overbruggen | |
| 4,356,937 A | 11/1982 | Simon et al. | |
| 4,393,982 A | 7/1983 | Kückens | |
| 4,450,987 A | 5/1984 | Boettcher | |
| 4,515,294 A | 5/1985 | Udall | |
| 4,518,105 A | 5/1985 | Kuckens et al. | |
| 4,550,858 A | 11/1985 | Noomen | |
| 4,624,395 A | 11/1986 | Baron et al. | |
| 4,708,266 A | 11/1987 | Rudick | |
| 4,722,372 A | 2/1988 | Hoffman et al. | |
| 4,791,859 A | 12/1988 | King | |
| 4,808,346 A | 2/1989 | Strenger | |
| 4,901,886 A | 2/1990 | Kirschner | |
| 4,903,586 A | 2/1990 | King | |
| 4,921,131 A | 5/1990 | Binderbauer et al. | |
| 5,114,047 A | 5/1992 | Baron et al. | |
| 5,154,319 A | 10/1992 | Deininger et al. | |
| 5,193,593 A | 3/1993 | Denis et al. | |
| 5,197,865 A | 3/1993 | Sevrain et al. | |
| 5,275,309 A | 1/1994 | Baron et al. | |
| 5,312,017 A | 5/1994 | Schroeder et al. | |
| 5,353,963 A | 10/1994 | Gorski et al. | |
| 5,615,801 A | 4/1997 | Schroeder et al. | |
| 5,662,461 A | 9/1997 | Ono | |
| 5,836,482 A | 11/1998 | Ophardt et al. | |
| 5,842,603 A | 12/1998 | Schroeder et al. | |
| 5,909,846 A | 6/1999 | Sasaki | |
| 5,918,768 A | 7/1999 | Ford | |
| 5,992,685 A | 11/1999 | Credle, Jr. | |
| 6,209,751 B1 * | 4/2001 | Goodin et al. | 222/52 |
| 6,343,724 B1 | 2/2002 | Ophardt et al. | |
| 6,568,565 B1 | 5/2003 | Schroeder et al. | |
| 6,651,849 B2 | 11/2003 | Schroeder et al. | |
| 6,662,976 B2 | 12/2003 | Jensen et al. | |
| 6,676,908 B2 | 1/2004 | Robinson, Sr. et al. | |
| 6,722,527 B1 | 4/2004 | Krauss | |
| 6,810,931 B2 | 11/2004 | Graffin | |
| 6,990,391 B1 | 1/2006 | Cunha et al. | |
| 7,048,149 B1 | 5/2006 | Lassota | |
| 7,077,339 B2 | 7/2006 | Leach | |
| 2004/0074921 A1 | 4/2004 | Lips et al. | |
| 2004/0084475 A1 | 5/2004 | Bethuy et al. | |
| 2004/0226962 A1 | 11/2004 | Mazursky et al. | |
| 2006/0144244 A1 | 7/2006 | Girard et al. | |
| 2006/0283889 A1 | 12/2006 | Mink et al. | |
| 2008/0029541 A1 | 2/2008 | Wallace et al. | |

FOREIGN PATENT DOCUMENTS

| | | |
|---|---|---|
| DE | 19523816 | 1/1997 |
| EP | 0 067 466 A2 | 12/1982 |
| FR | 2813861 | 3/2002 |
| JP | 3129494 | 6/1991 |
| JP | 6211299 | 8/1994 |
| NL | C 1003894 | 8/1996 |
| WO | WO 91/18826 | 12/1991 |
| WO | WO 99/37577 | 7/1999 |
| WO | 0079224 | 12/2000 |
| WO | 0149154 | 7/2001 |
| WO | WO 02/081354 A1 | 10/2002 |
| WO | 2004104527 | 12/2004 |
| WO | WO 2005/070816 A1 | 8/2005 |
| WO | WO 2005/071267 A1 | 8/2005 |

* cited by examiner

LIQUID CONCENTRATE/EXTRACT BEVERAGE DISPENSER WITH REPLACEABLE CONCENTRATE/EXTRACT CARTRIDGE

CROSS REFERENCE TO RELATED APPLICATIONS

This application is a continuation-in-part of U.S. patent application Ser. Nos. 11/055,832 and 11/055,915, both filed Feb. 11, 2005, and both claiming the benefit of U.S. provisional application No. 60/544,379, filed Feb. 13, 2004, U.S. provisional application No. 60/620,251, filed Oct. 19, 2004, and U.S. provisional application No. 60/642,311, filed Jan. 7, 2005, which are incorporated by reference as if fully set forth. This application is also a continuation-in-part of U.S. patent application Ser. No. 11/209,016, filed August 2005 which claims the benefit of U.S. provisional application No. 60/642,311, filed Jan. 7, 2005, U.S. provisional application No. 60/682,107, filed May 18, 2005, and U.S. provisional application No. 60/700,824, filed Jul. 20, 2005, which are incorporated by reference as if fully set forth.

BACKGROUND

The present invention relates to a beverage dispenser which dispenses a beverage made from a diluent, such as water, and a liquid beverage concentrate/extract. More particularly, the invention relates to a hot beverage dispenser for dispensing hot coffee, hot tea or hot chocolate made from a liquid beverage concentrate/extract and water.

Beverage dispensers are known for making a beverage from a liquid concentrate/extract. In one known prior art reference, a pressurized liquid canister of liquid beverage concentrate/extract is placed within a pitcher-shaped device having a mechanism for releasing a predetermined amount of liquid concentrate/extract from the pressurized canister into a beverage mixing chamber. A heated liquid reservoir is located at the bottom of the vessel and heated liquid is also forced upwardly into the mixing chamber where the mixed beverage is formed in the device prior to being poured. This device has several drawbacks due to the complex nature of the dispensing mechanism and the need to clean out the mixing chamber in the device after each use. It is also known to provide a coffee machine for use with shelf-stable liquid coffee concentrate/extract. The liquid coffee concentrate/extract is poured into a reservoir in the coffee maker and a predetermined amount of the concentrate/extract is moved from the reservoir to the brewing chamber, where it is mixed with heated water prior to being dispensed into a carafe. While this device overcomes the need for coffee filters and ground coffee and allows the use of a shelf-stable liquid coffee concentrate/extract, the entire machine must be cleaned after use, due to the fact that the coffee concentrate/extract is poured into the coffee machine prior to being delivered to a brewing chamber in the machine. Additionally, it is not possible to switch the type of beverage being dispensed in an easy and convenient manner.

Another problem with many known beverage dispensers which combine concentrate/extract and water is a poor mixing of the concentrate/extract and water. Such known dispensers often dispense a stream of concentrate/extract and water which is not adequately mixed, and accordingly, lacking homogeneity. Complete mixing does not take place until the fluids enter a user's cup. Many users consider a stream of non-homogeneous beverage to be visually unappealing and indicative of a lack of quality of the beverage dispenser or beverage being dispensed. An unmixed stream of concentrate/extract and water dispensed by a beverage dispenser is sometimes identified by the trade term "striping" or as the "zebra effect".

It has also been suggested to provide a beverage system for brewing a beverage from a dry beverage material and a source of hot, pressurized water. The beverage material is provided in a sealed cartridge and the dispenser pierces the sealed cartridge and injects hot, pressurized water into the cartridge to brew the beverage from the beverage material. A carousel device may be provided, which allows a user to select from one of several different beverage cartridges. However, a drawback of this device is that residue from a previous beverage will remain in the hot, pressurized water-injecting area as well as in the downstream collection funnel, which directs the beverage into a user's cup. Further, in the case of typical beverage systems of this type for producing hot coffee drinks, dry coffee material including instant, non-brewed coffee product is provided. Such non-brewed coffee product typically produces coffee beverages which to at least some extent lack the distinct flavor of brewed coffee.

It would be desirable to provide a more convenient and easy way to mix and dispense multiple types of beverages from a single-beverage dispenser in a convenient and user friendly manner, and also without the need for cleaning the dispenser when a user wishes to change the type of beverage being dispensed. It would also be desirable to allow a user to select a beverage strength from a number of different selections so that a user's preference can be satisfied. It would also be desirable to provide a beverage dispenser that allows a user to dispense an exact desired amount of beverage and that does not waste excess beverage concentrate/extract in a user's container or in the dispenser itself. It would be further desirable to allow a user to select from multiple beverage types and to select from multiple beverage container sizes, such as coffee mugs or disposable cups having different sizes while still providing the beverage at a desired strength. Further, it would be desireable to provide a beverage dispenser which dispenses a mixture of concentrate/extract and water or other diluent which is well-mixed and homogeneous prior to entering a user's container.

SUMMARY

The present invention provides a concentrate/extract cartridge for a beverage dispenser for dispensing a liquid concentrate/extract and a diluent. The cartridge includes a hollow body and a dispensing tube connected to the hollow body. A piston is slideably contained by an interior surface of the dispensing tube. The cartridge includes a valve having a valve stem that passes through a port of a valve seat connected to the dispensing tube. The port defines a flow passage through the dispensing tube. The valve stem is connected to the piston at a first end of the valve stem, and a valve body is located at a second end of the valve stem in removable contact with the valve seat for alternately opening and closing the port.

The present invention also provides a beverage dispenser having a removably insertable concentrate/extract cartridge of the type described above disposed in a cartridge receiving area. The dispenser includes a housing including a dispensing area for dispensing a beverage into a container. A dispensing actuator is located in the housing. A pump or a control valve is provided in communication with a source of diluent to be dispensed into the dispensing area. A controller is located in the housing to control the actuator to discharge concentrate/extract from the cartridge and to control the pump or the control valve to discharge diluent so that the concentrate/extract and diluent are dispensed into the dispensing area.

A method of dispensing a selected beverage made from concentrate/extract and a diluent is also provided.

BRIEF DESCRIPTION OF THE DRAWING(S)

DETAILED DESCRIPTION OF THE PREFERRED EMBODIMENT(S)

Figure 1:
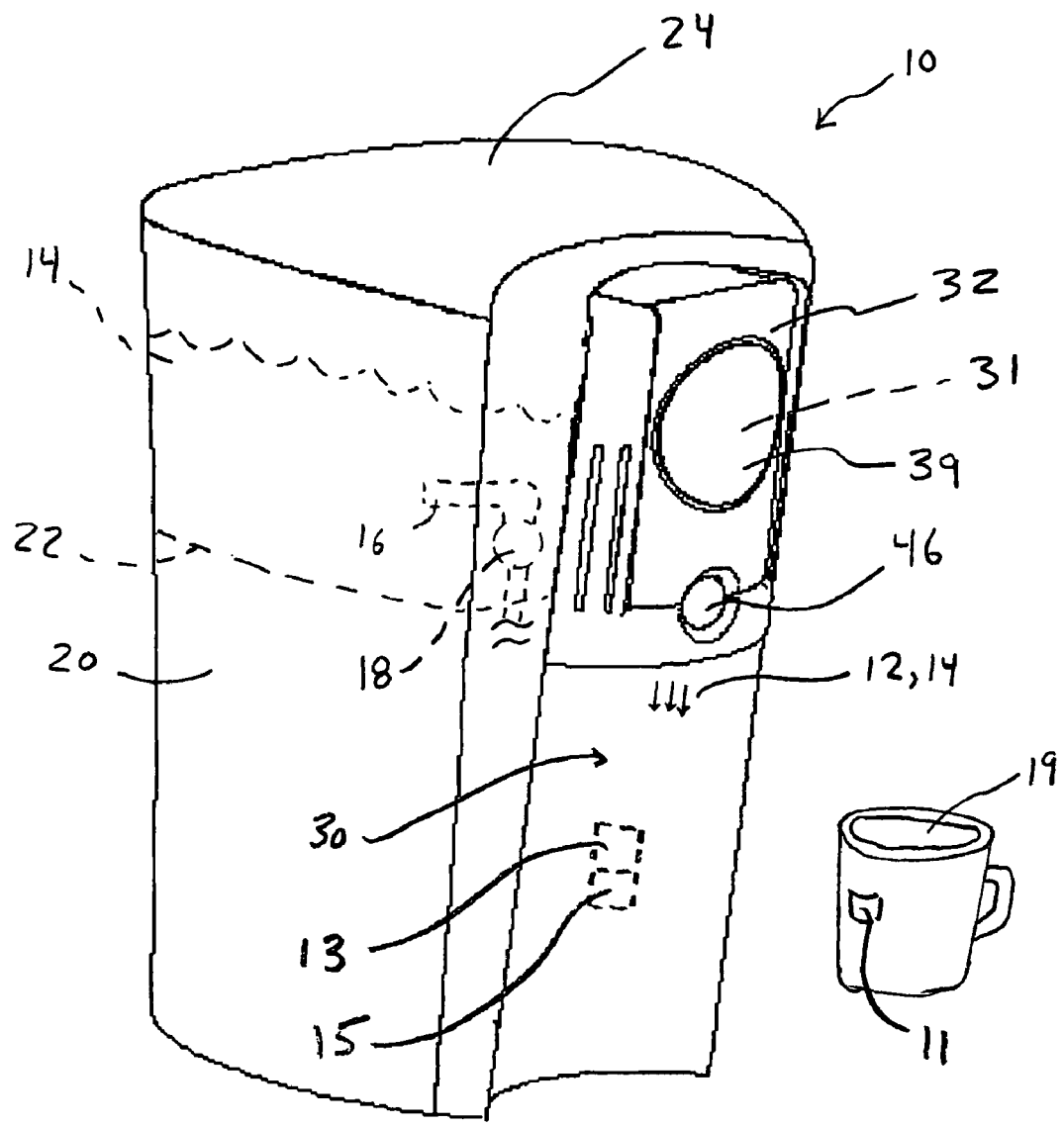
FIG. 1 is a left side perspective view of a beverage dispenser in accordance with a first preferred embodiment of the present invention.

Certain terminology is used in the following description for convenience only and is not considered limiting. Words such as "front", "back", "top" and "bottom" designate directions in the drawings to which reference is made. This terminology includes the words specifically noted above, derivatives thereof and words of similar import. Additionally, the terms "a" and "one" are defined as including one or more of the referenced item unless specifically noted. The phrase "at least one" followed by a list of two or more items, such as A, B, or C, means any individual one of A, B or C as well as any combination thereof.

The preferred embodiments of the present invention are described below with reference to the drawing figures where like numerals represent like elements throughout.

Referring now to FIG. 1, a beverage dispenser 10 adapted to dispense a beverage comprising a liquid concentrate/extract (designated by arrows 12 in a dispensing area 30) and a diluent 14 (in a reservoir 22 and designated by arrows 14) is provided. The dispenser 10 functions in a manner similar to the dispensers described in related U.S. patent application Ser. Nos. 11/055,832 and 11/055,915, which are incorporated by reference herein as if fully set forth. The present beverage dispenser 10 utilizes a beverage concentrate/extract cartridge 50, as shown in FIGS. 2 and 5-8, which differs from concentrate/extract cartridges disclosed in the above-mentioned related applications.

The dispenser 10 includes a housing 20 with a diluent reservoir 22 located therein. The housing 20 is preferably a molded polymeric housing. However, those skilled in the art will recognize that other materials can be used to form the housing 20. Additionally, the diluent reservoir 22 is preferably also made of a molded polymeric, hydrolysis-resistant material, such as polyethylene or HDPE. However, any other suitable food grade material may be utilized. Preferably, a removable cover 24 is located on top of the dispenser housing 20 and covers the diluent reservoir 22. Alternatively, a mesh grid arrangement can be provided so that the cover 24 need not be removable and liquid diluent 14, such as water, can be poured directly through the cover 24 and into the reservoir 22. Preferably, the cover 24 is also made of a suitable molded polymeric material. However, other types of materials may be used, if desired.

Figure 2:
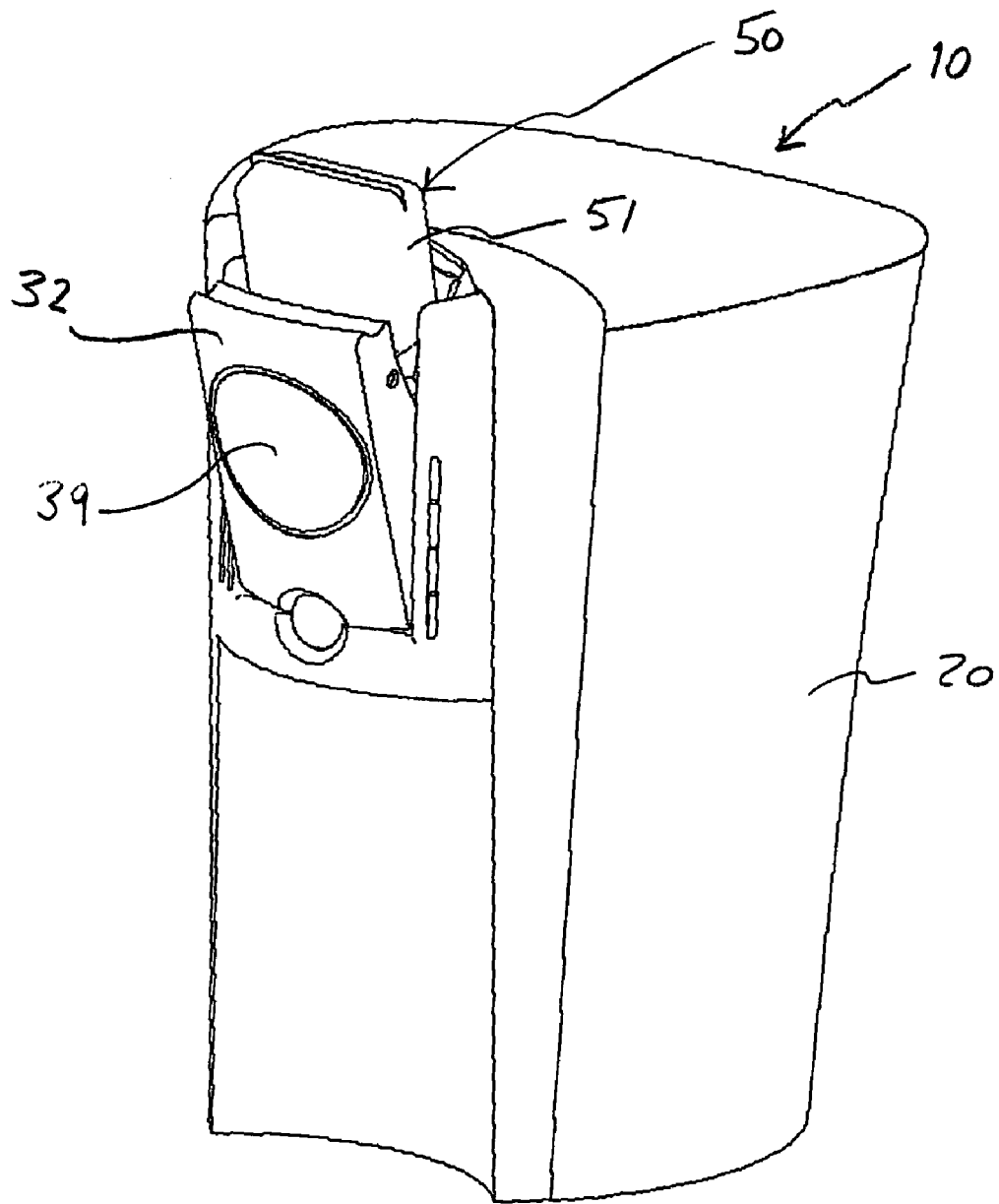
FIG. 2 is a right side perspective view of the beverage dispenser of FIG. 1 in a cartridge loading position.
Figure 3:
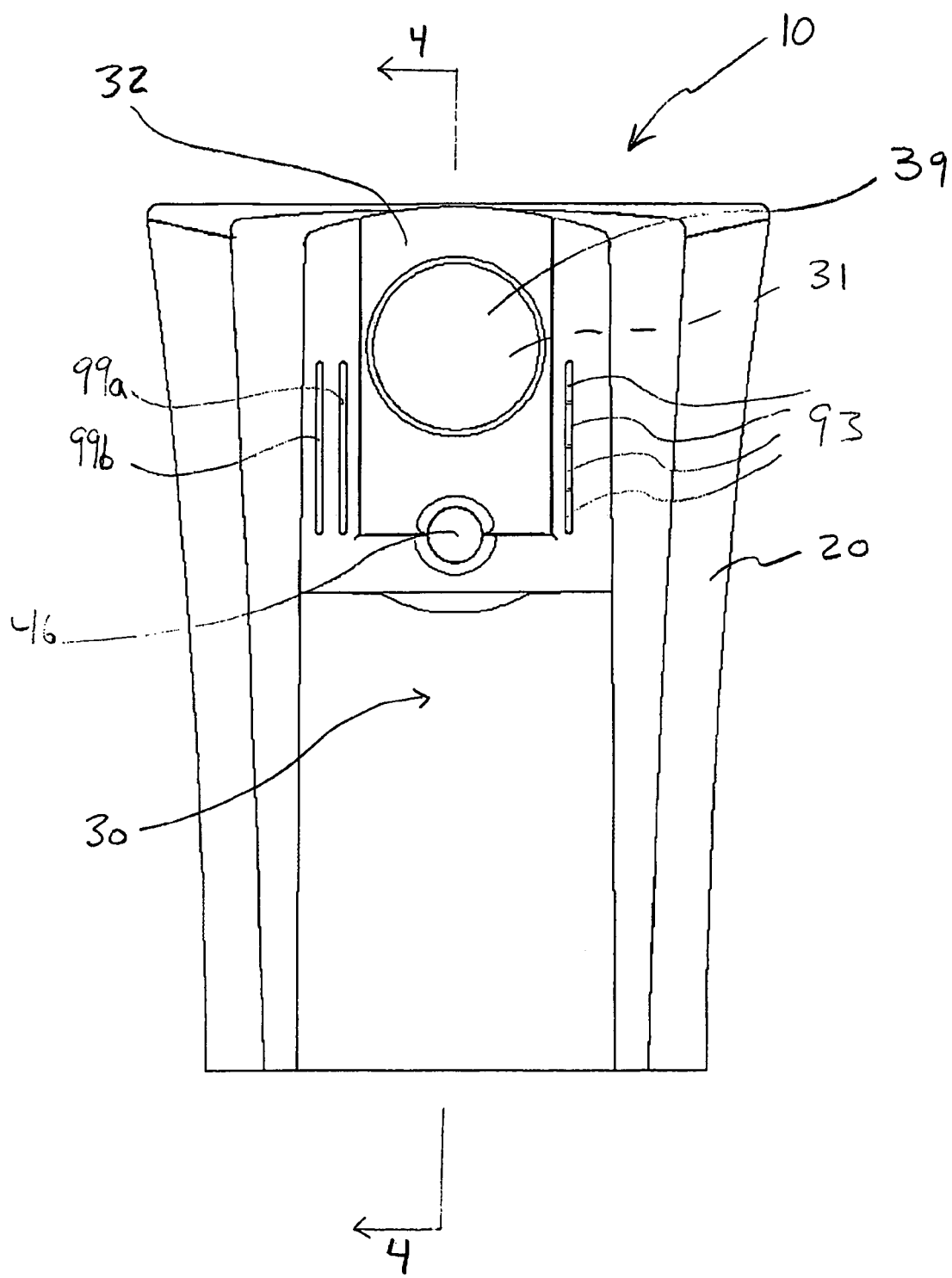
FIG. 3 is a front elevational view of the beverage dispenser of FIG. 1.

As shown in FIGS. 1 and 2, a dispensing area 30 is located at the front of the dispenser housing 20. The dispensing area 30 is adapted to allow placement of a beverage container, such as a cup 19, thereunder. Preferably, the housing 20 is sized and shaped so that a variety of different sized beverage containers, such as glasses, coffee cups or mugs or various other beverage containers can be placed under the dispensing area 30, which is preferably at the front of the housing 20.

In a preferred embodiment, the diluent reservoir 22 is heated by a heating element which is thermostatically controlled via a user adjustable thermostat which senses when a predetermined temperature has been reached as shown and described in related application Ser. Nos. 11/055,832 and 11/055,915. While use of the heating element is optional so that cold or room temperature as well as hot beverages can be dispensed using the dispenser 10, in one particularly preferred embodiment wherein the dispenser 10 is used as a hot beverage dispenser, such as for hot coffee, hot tea and/or hot chocolate, a heating element is required.

Figure 4:
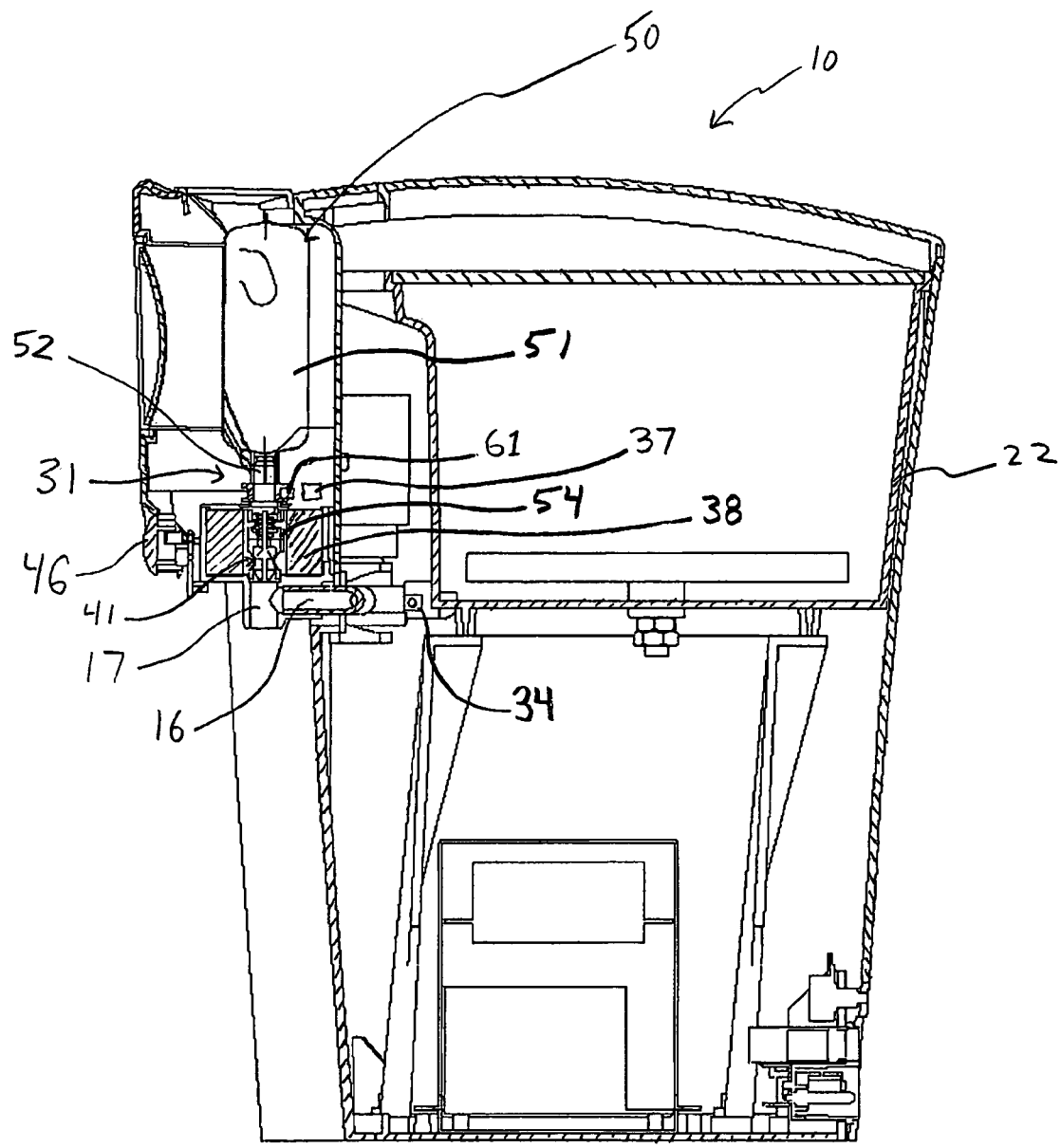
FIG. 4 is a cross-sectional view of the beverage dispenser of FIG. 1 taken along line 4-4 in FIG. 3.
Figure 5:
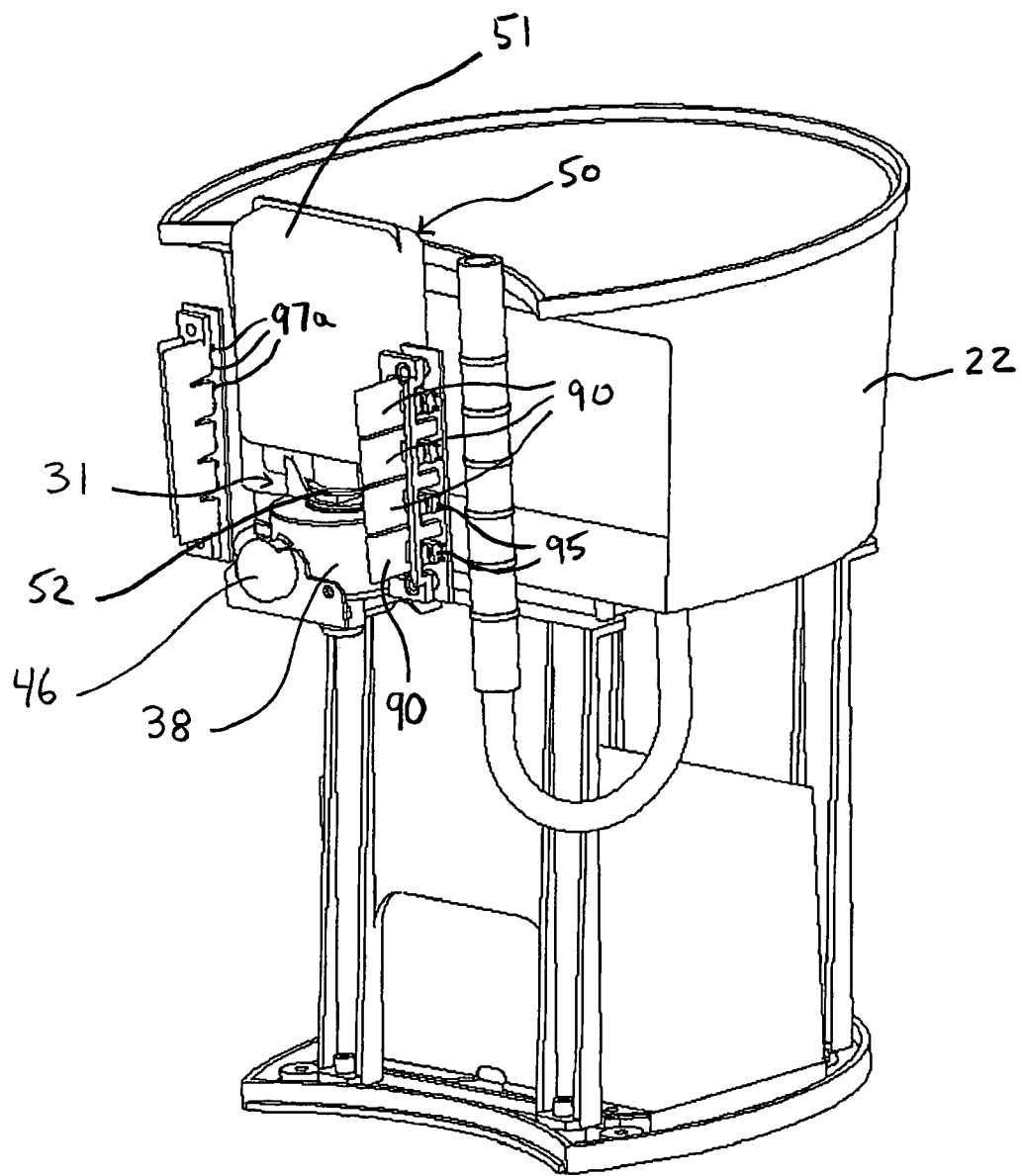
FIG. 5 is a right side perspective view of the beverage dispenser of FIG. 1 with its housing removed.
Figure 6:
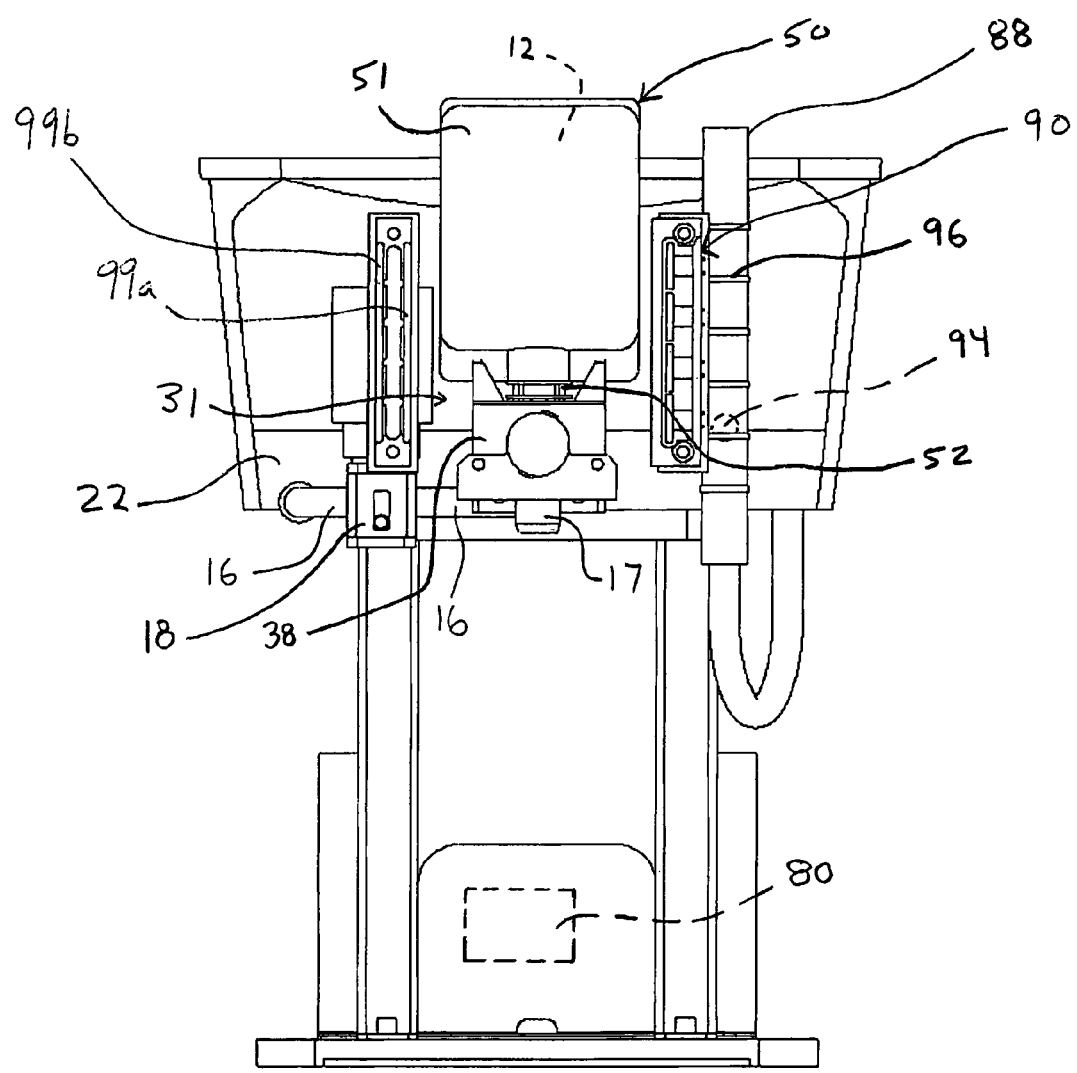
FIG. 6 is a front elevational view of the beverage dispenser of FIG. 1 with its housing removed.
Figure 7:
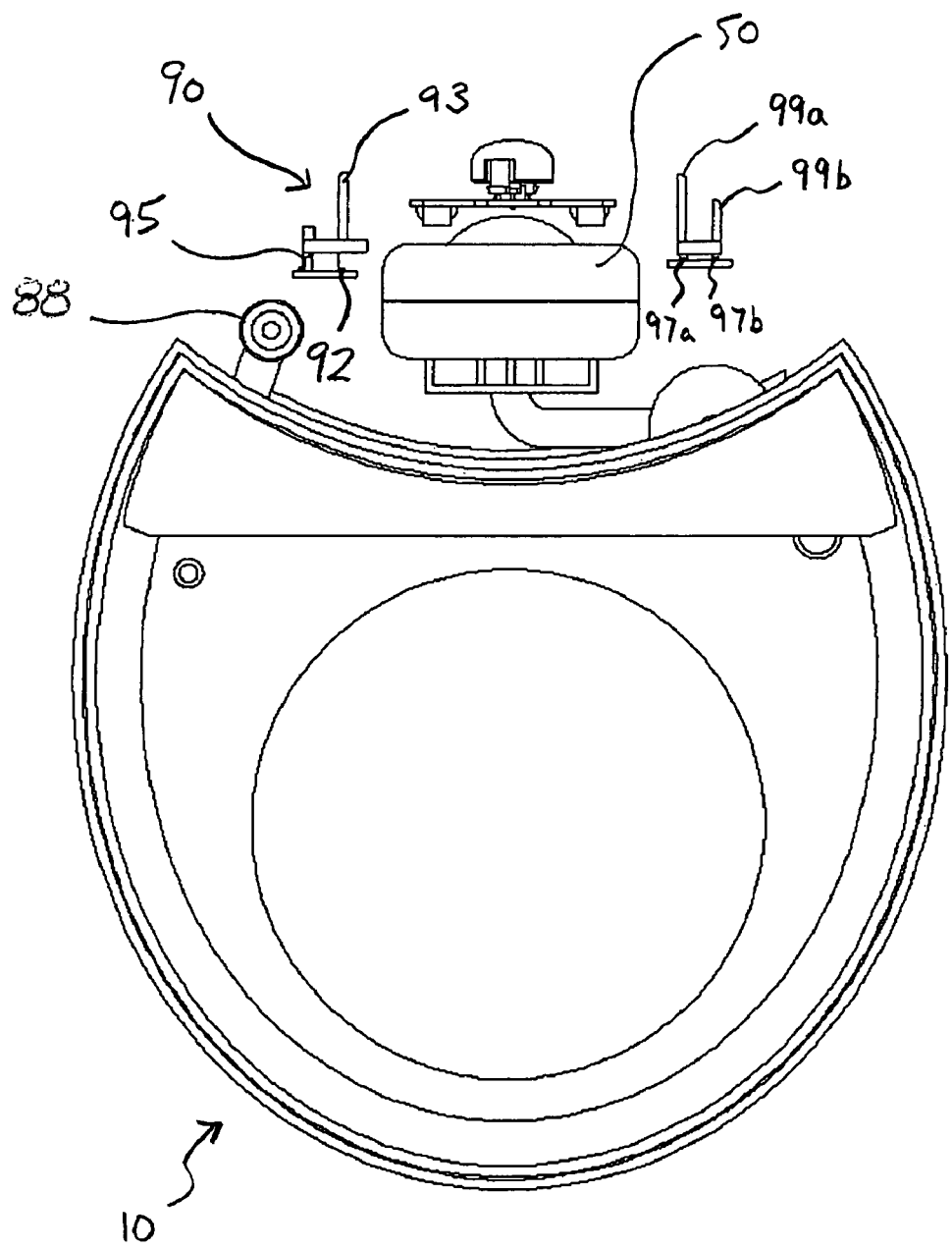
FIG. 7 is top plan view of the beverage dispenser of FIG. 1 with its housing removed.
Figure 8:
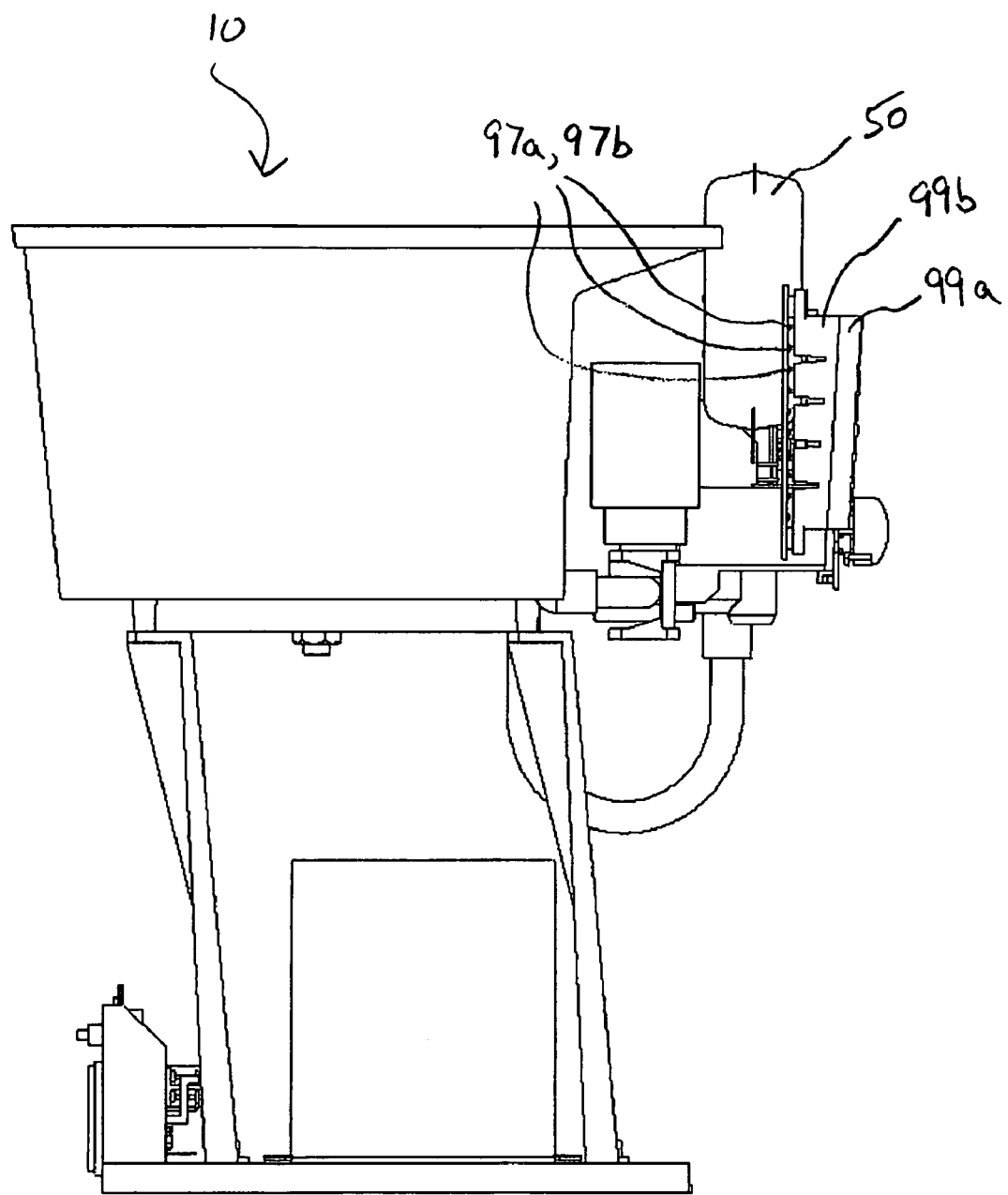
FIG. 8 is a left side elevational view of the beverage dispenser of FIG. 1 with its housing removed.
Figure 9:
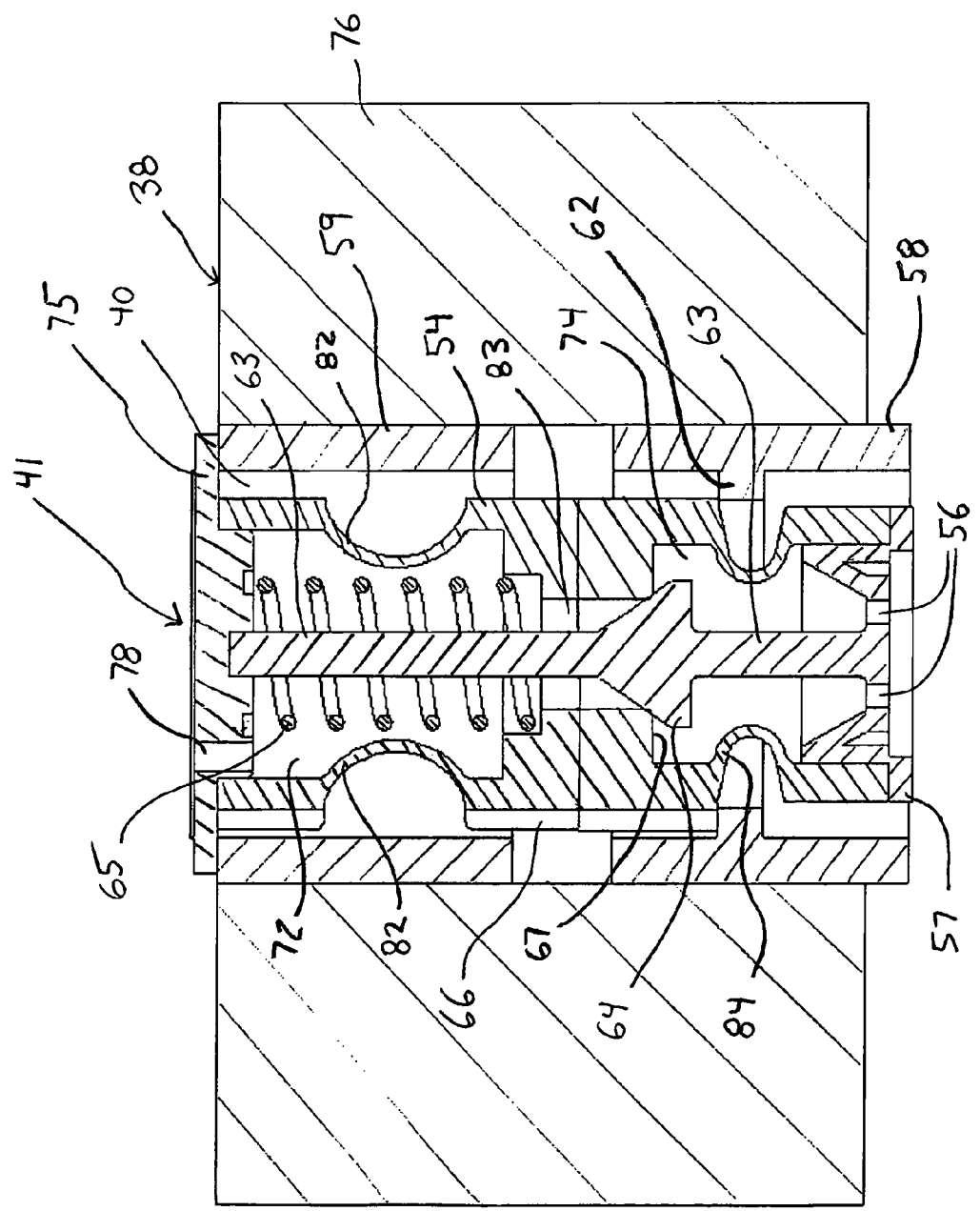
FIG. 9 is a cross-sectional view of a pump device and dispensing actuator of the beverage dispenser of FIG. 1 taken along line 4-4 in FIG. 3, the pump device and dispensing actuator shown in a first position.

As shown in FIGS. 1, 4 and 6, preferably a reservoir supply line 16 is connected to the reservoir 22 and delivers the diluent 14 to the dispensing area. The supply line 16 is preferably connected to a control valve 18 that can dispense water from the reservoir to the dispensing area at varying rates. The control valve 18 is preferably a solenoid driven pinch valve, as shown; however, any suitable control valve can be used. Alternatively, the supply line 16 could be connected to a pump for emptying diluent 14 from the reservoir 22. Preferably a flow meter 34 is connected to the supply line 16 for providing diluent flow rate information to the controller 80. This information is preferably used by the controller 80 to adjust a rate of actuation of a dispensing actuator 38, as described below, to dispense a desired amount of concentrate/extract 12 relative to an amount of dispensed diluent 14. Alternatively, based on the diluent flow rate information received, the controller 80 can control the control valve 18, or alternatively a diluent discharge pump, permitting discharge of an appropriate amount of diluent 14 relative to an amount of dispensed concentrate/extract 12.

Preferably, a level sensor is provided, which can be in the form of a stack pipe 88, for determining a level of the diluent 14 in the reservoir 22. The stack pipe 88 preferably includes a metallic float 94 and a plurality of spaced apart coils 96 for signaling a position of the float 94 to the controller 80. The information regarding diluent level can be used by the controller 80 to turn on and off a heating element for heating the diluent 14 or to provide information to a user regarding diluent level. One skilled in the art will recognize that other diluent level detectors such as a float, photo eye or electric resistance type detectors can be used to determine the diluent level in the diluent reservoir 22.

As shown in FIGS. 1 and 3-6 a cartridge receiving area 31 is located in the housing 20. The cartridge receiving area 31 is preferably in the form of a recess located in the housing 20 sized to receive a beverage concentrate/extract cartridge 50, described in detail below. A loading door 32 swings open for loading the cartridge 50 into the cartridge receiving area 31. A view window 39 is preferably provided on the loading door 32 to allow inspection of the cartridge 50.

As shown in FIGS. 2, 4, 5, and 6, the cartridge 50 includes a hollow body 51 for containing the liquid concentrate/extract 12. The hollow body 51 is preferably collapsible and fabricated from a flexible laminate sheet including layers of one or more of polyethylene, polyester, and metallic foil. Alternatively, other suitable materials can be used to create the flexible laminate sheet. A spout connector 52 is preferably sealably connected to the hollow body 51. An inner layer of the hollow body 51 preferably includes features, such as sealing areas, which contact and align with cooperating features on the connector 52. During assembly, heat and pressure is applied for a predetermined period of time to the area where the hollow body 51 and the connector 52 are in contact, sealably connecting the hollow body 51 to the connector 52. Preferably, the inner layer of the hollow body 51 and the connector 52 are made of the same material, for example polyethylene, or otherwise made of compatible materials, so that when heat and pressure are applied, the hollow body 51 and connector 52 are sealed together. Alternatively, the connector 52 can be adhered to the hollow body 51 using any suitable adhesive and/or adhering method.

Referring to FIGS. 4 and 9-13, a pump device 41 is connected to the spout connector 52. The pump device 41 is preferably adhered or mechanically fastened to the spout connector 52. Alternatively, the pump device 41 can be integrally formed with the spout connector 52. The pump device 41 includes an axially resilient dispensing tube 54 connected to a cap 75 which preferably provides the connection to the spout connector 52. The dispensing tube 54 may be fabricated from a single piece or multiple pieces connected together as shown. The cap 75 includes apertures 78 which allow liquid concentrate/extract 12 to pass from the hollow body 51 into the axially resilient dispensing tube 54. The dispensing tube 54 includes accordion-like top and bottom flexing members 82, 84 which permit volumetric adjustment of top and bottom chambers 72, 74 of the pump device 41. A valve 60 is formed by a center portion of the resilient tube that comprises a valve seat 67 having a port 83 for passing a flow of fluid concentrate/extract 12 therethrough, and a valve stem 63 connected to, and preferably integrally formed with, a valve body 64 for alternately covering and uncovering the port 83 in the valve seat 67. The valve stem 63 extends through the valve body 64 and is connected to an end cap 57 at a first end thereof and connected to the top cap 75 at a second end thereof. The end cap 57 is preferably rigidly connected to an end of the dispensing tube 54. The end cap 57 includes through apertures 56, for passing a flow of the liquid concentrate/extract 12 out of the pump device 41. A spring 65 is preferably provided to bias the top flexing member 82 toward an extended position resulting in the maximization of the volume of the top chamber 72 absent an application of external force. Alternatively, the spring 65 can be omitted and the flexing member 82 can be configured to provide sufficient resilience to maximize the volume of the top chamber 72.

Referring to FIGS. 4-6 and 9-10, a dispensing actuator 38 is fixed within the cartridge receiving area 31 and includes an opening 40 for receiving the pump device 41 of the cartridge 50 therein. The dispensing actuator 38 also includes an electromagnet 76 which preferably comprises a wound coil. A sliding ferromagnetic sleeve 58 is preferably concentrically aligned with the electromagnet 76. Preferably, a ferromagnetic stop member 59 is connected to the dispensing actuator 38 limiting the motion of the sliding sleeve 58 and channeling magnetic flux produced by the electromagnet 76. The ferromagnetic sleeve 58 includes a circumferential protrusion 62. When the cartridge 50 is in an installed position in the receiving area 31, bearing members 66 on the center portion of the resilient tube contact the circumferential protrusion 62 of the sliding ferromagnetic sleeve 58.

The electromagnet 76 receives current, such as alternating or direct current, from the controller 80 as described in the aforementioned related applications. In a preferred embodiment, the controller 80 intermittently provides 24 volts over the coil to produce an intermittent direct current which induces an intermittent magnetic field.

Figure 10:
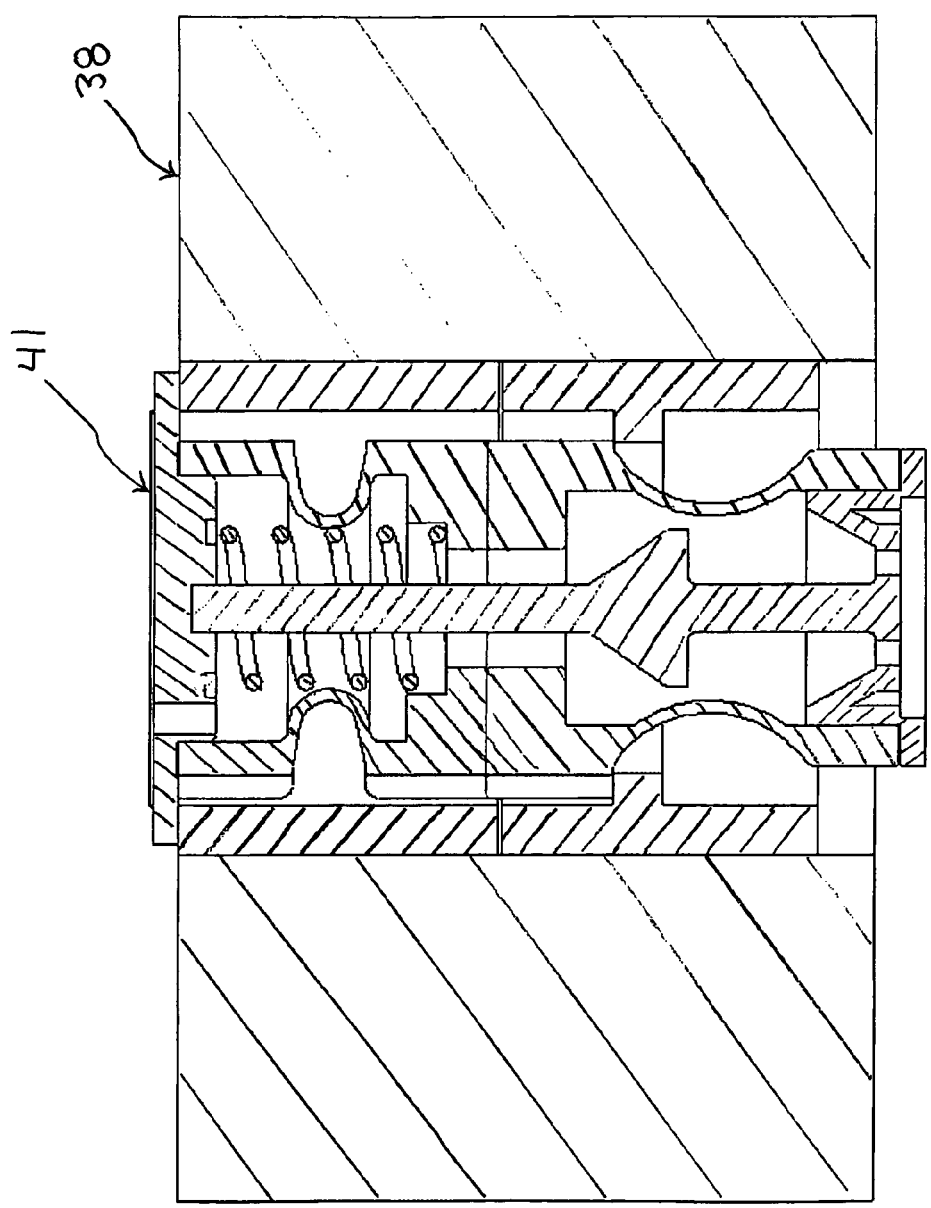
FIG. 10 is a cross-sectional view of the pump device and dispensing actuator of the beverage dispenser of FIG. 1 taken along line 4-4 in FIG. 3, the pump device and dispensing actuator shown in a second position.
Figure 11:
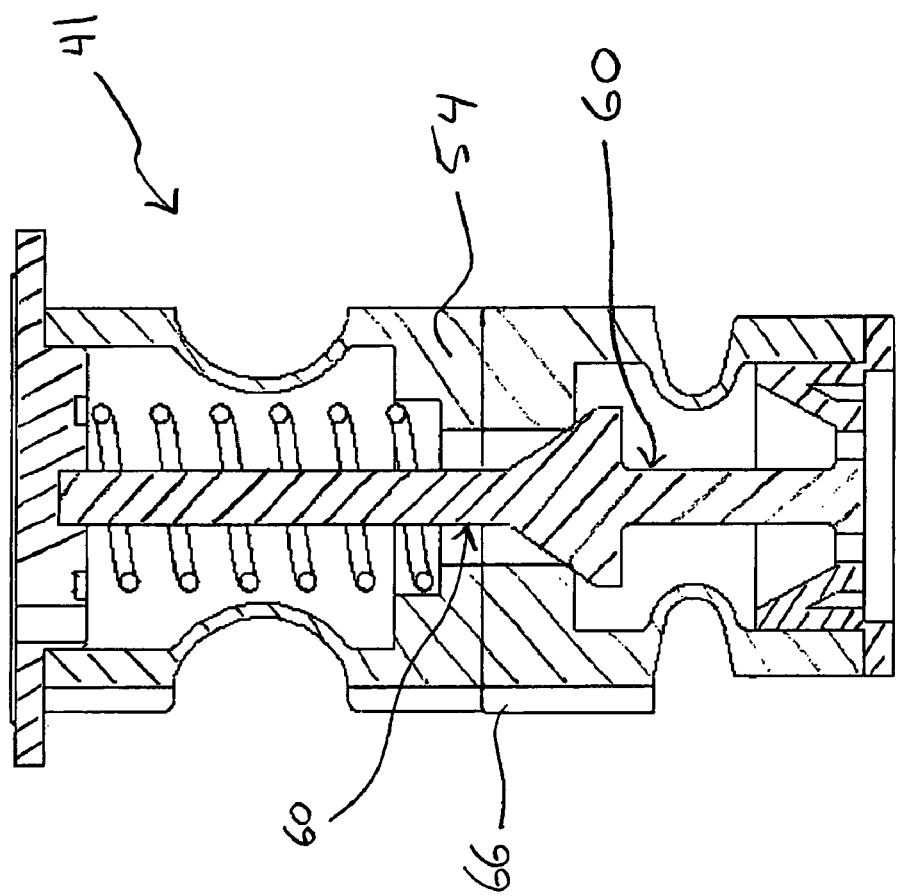
FIG. 11 is a cross-sectional view of the pump device of the beverage dispenser of FIG. 1 taken along line 4-4 in FIG. 3, the pump device shown in the first position.
Figure 12:
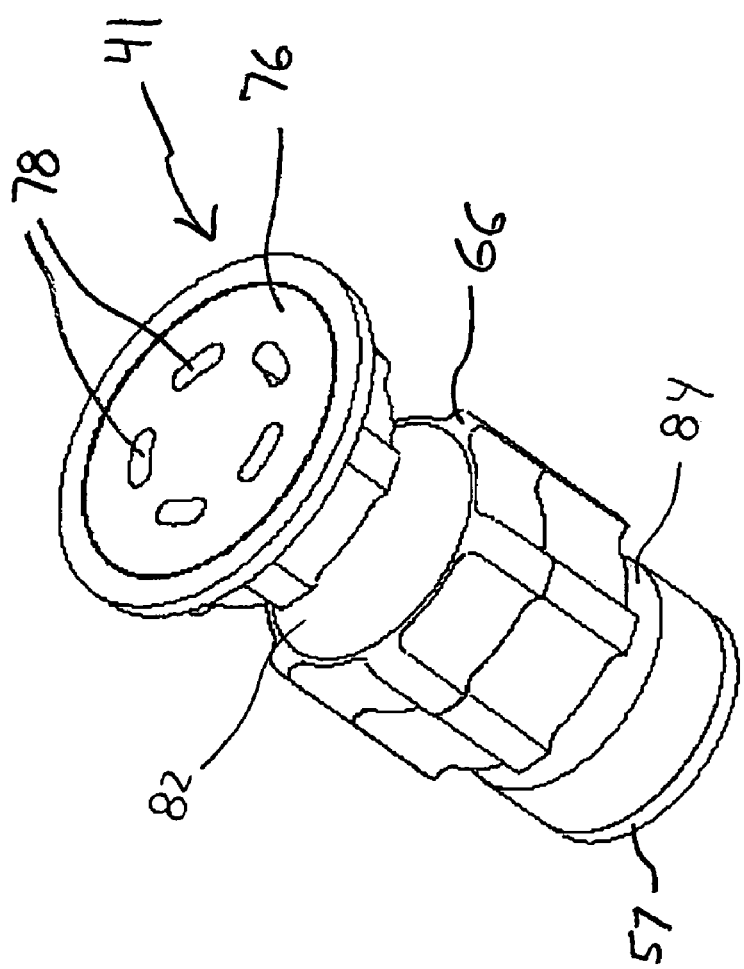
FIG. 12 is a perspective view of the pump device of the beverage dispenser of FIG. 1 showing a top end of the pump device.
Figure 13:
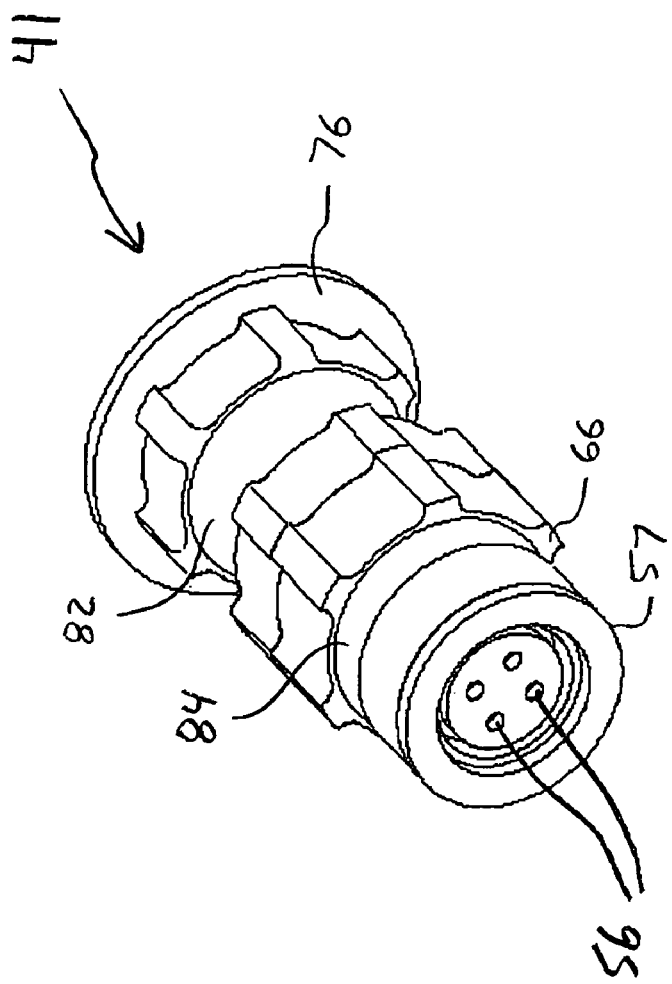
FIG. 13 is a perspective view of the pump device of the beverage dispenser of FIG. 1 showing a bottom end of the pump device.

The cartridge 50 dispenses the liquid concentrate/extract 12 as follows. Current is induced in the wound coil by an applied voltage, preferably 24 volts over the electromagnet 76 as provided by the controller. Alternatively, the controller can provide other suitable voltages for producing alternating or direct current. The application of voltage causes the ferromagnetic sleeve 58 to be drawn from the position shown in FIGS. 9 and 11 toward the electromagnetic center of the electromagnet 76 and against the stop member 59 as shown in FIG. 10. The valve seat 67 and valve port 83 of the resilient tube 54 follow in an upward motion with the ferromagnetic sleeve, displacing the valve seat 67 from the valve body 64 while compressing the top flexing member 82 and extending the bottom flexing member 84, as shown in FIG. 10. During the upward motion of the ferromagnetic sleeve 58, liquid concentrate/extract in the top chamber 72 is forced through the port 83, as it is uncovered by the valve body 64, and into the bottom chamber 74 of the dispensing tube 54. Next, the controller cuts off voltage to the actuator 38, allowing the ferromagnetic sleeve 58 to move downwardly away from the stop member 59 by force of the spring 65 and gravity, forcing the valve seat 67 against the valve body 64, while extending the top flexing member 82 and compressing the bottom flexing member 84. During downward motion of the ferromagnetic sleeve 58, the bottom chamber 74 decreases in volume and fluid concentrate/extract in the bottom chamber is forced through the apertures 56 and out of the pump device 41, while at the same time, fluid concentrate/extract 12 from the hollow body 51 is drawn into the top chamber 72 through the cap apertures 78. The hollow body 51 is preferably collapsible and collapses to facilitate the extraction of fluid concentrate/extract 12 from the hollow body. A voltage, such as the preferred 24V DC producing voltage, or other suitable AC or DC producing voltage, is cycled on and off to provide an intermittent current for repeating the above-described process continuously until a desired amount of the liquid concentrate/extract 12 is dispensed. Alternatively, other types of actuators can be used to act against the circumferential protrusion 62 to compress the flexing member 82.

A trigger 46 is provided, which when pressed signals the controller to provide an intermittent current to the electromagnet 76 to initiate the dispensing of the liquid concentrate/extract 12 from the cartridge 50. Referring to FIG. 6, fluid concentrate/extract 12 dispensed from the cartridge 50 preferably enters a joining tube 17 fixed within the cartridge receiving area 31. At the same time, the controller opens the diluent control valve 18 to transfer liquid diluent 14 from the reservoir 22 through the diluent supply line 16 into the joining tube 17. A stream of diluent 14 is preferably dispensed generally into the discharge of the concentrate/extract 12 in close proximity to the dispensing tube 54. In this manner, a uniform and substantially homogenous mixture of concentrate/extract 12 and diluent 14 exits the joining tube 17 into the dispensing area 30. This configuration is useful to prevent dispensing of poorly mixed concentrate/extract, known to those skilled in the art as "striping" or the "zebra effect". Most preferably, the diluent 14 is dispensed generally perpendicular to the discharge of the concentrate/extract 12 as shown to increase mixing.

Preferably, the controller 80 continues to dispense diluent 14 for a short period of time after stopping the dispensing of the concentrate/extract 12 in order to clean the joining tube 17 of residual concentrate/extract 12. Alternatively, the joining tube 17 can be omitted, and the supply line 16 and the dispensing tube 54 of the cartridge 50 are directed such that during dispensing, a stream of discharged concentrate/extract 12 enters a stream of discharged diluent 14 to promote mixing.

Referring to FIGS. 3 and 5-8, touch pad input controls 90, preferably including buttons 93 and switches 95, are provided to vary the strength of the beverage allowing a user to select a desired strength of the beverage. Visual indicators such as LEDs 92 indicate a selected beverage strength. Preferably, the buttons 93 are light pipes, as shown, for channeling light from the LEDs 92. Visual indicators such as LEDs 97a project light through light guides 99a to indicate the amount of concentrate/extract 12 remaining. Visual indicators such as LEDs 97b project light through light guides 99b to indicate the amount of diluent 14 remaining in the reservoir 22.

User input from the input controls 90 is used by the controller 80 to determine an amount of concentrate/extract 12 to be mixed with the diluent 14. This can be done by varying the speed by which the diluent 14 is dispensed by the control valve 18, and/or by controlling the electromagnet 76 to vary the rate at which the pump device 41 pumps. Preferably, the diluent 14 is dispensed from the reservoir 22 by gravity, and the liquid concentrate/extract 12 is dispensed from the cartridge 50 at a rate which is dependent on the selected beverage strength. The controller 80 preferably compensates for a decreasing reservoir diluent level (and the resultant decreasing diluent flow rate) by adjusting the rate at which the pump device 41 pumps. The adjustment of the pumping rate of the pump device 41 can occur several times, for example 8-10 times, during the dispensing of concentrate/extract 12 and diluent 14 into a single beverage container. Alternatively, the decreasing diluent level in the reservoir 22 can be compensated for during dispensing by opening the control valve 18 wider or through the use of a pump, and the liquid concentrate/extract 12 can be dispensed from the cartridge 50 at a constant rate which is dependent only on the selected beverage strength.

Those skilled in the art will recognize that various numbers of different preset beverage strengths can be utilized and selected, for example through use of the input controls 90. Additionally, the beverage strength could be continuously variable, based on a user control with selected ranges shown as preferred for different types of beverages. Alternatively, a switch can be provided to allow a user to signal to the controller 80 which type of beverage is installed so that the controller 80 adjusts the amount of concentrate/extract 12 being dispensed accordingly. Preferably, an ID 61 is provided on the cartridge 50 to indicate the type of beverage concentrate/extract 12 that is in the cartridge 50. The ID is preferably automatically recognized by the controller 80 through either a different shape or different indicia located on the cartridge 50, which contact is read by a sensor 37 located in the receiving area 31 when the cartridge 50 is installed. The ID 61 on the cartridge could also include a radio frequency identification (RFID) tag which communicates with the sensor 37, having an RFID reader, positioned as shown or anywhere in the receiving area 31. Alternatively, the ID 61 on the cartridge could include a barcode or computer readable symbols readable by a barcode reader or other visual-type reader positioned in the receiving area 31. Alternatively, the ID 61 could include an alignment pin for activating one of a plurality of switches to inform the controller 80 which type of beverage is installed. Alternatively, one or more functional components, for example the pump device 41, can be shaped and/or sized to indicate a beverage type, the shape and/or size of the functional component being able to be sensed by a sensor in the cartridge receiving area 31. In addition, a container ID 11, for example an RFID, can be provided on the container 19 to be read by a sensor 13, for example an RFID reader, in the dispensing area 30. The container ID 11 preferably includes a user's beverage strength preference information. The beverage strength information can be preprogrammed or programmed by the user through use of an ID writer 15, for example an RFID writer in the dispensing area 30, and using the input controls 90 to indicate a user's beverage strength preference.

The controller 80 preferably records an amount of pumping cycles performed by the pump device 41 to determine the amount of concentrate/extract 12 dispensed. Accordingly, the controller 80 signals the LEDs 97a to indicate an amount of concentrate/extract 12 remaining in the cartridge 50. Further, the controller 80 preferably uses information received from the stack pipe 88 to signal the LEDs 99a to indicate a level of diluent 14 remaining in the reservoir 22.

Figure 14:
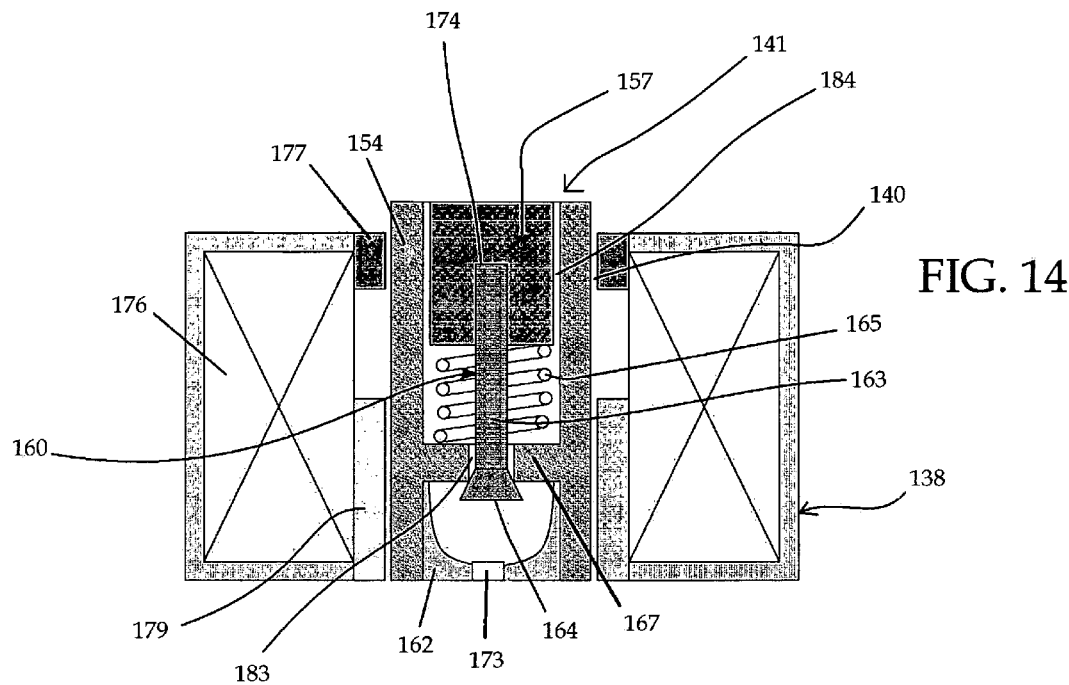
FIGS. 14-15 are cross-sectional views of a nozzle assembly for use in a beverage dispenser according to a second preferred embodiment of the present invention.
Figure 15:
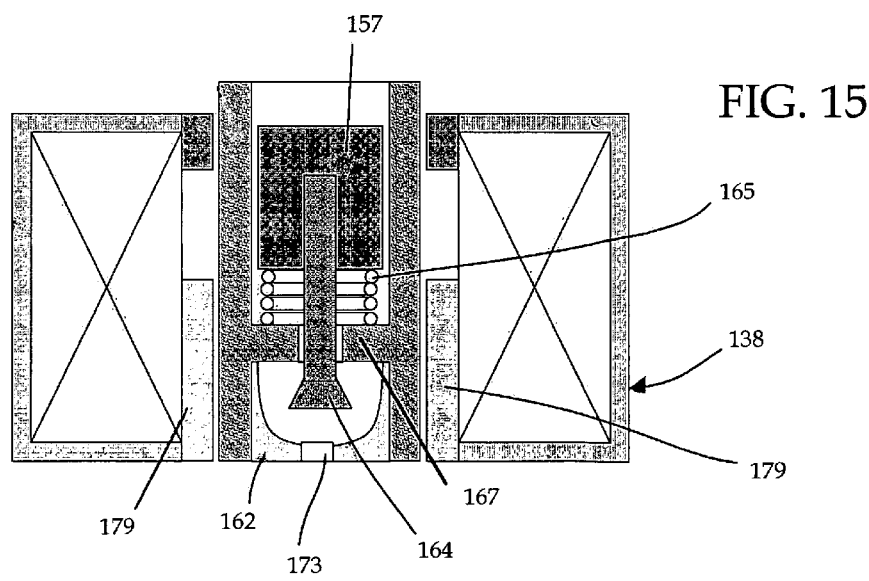

Referring to FIGS. 14-15, a nozzle assembly 141 for use in a dispenser according to a second preferred embodiment of the present invention is shown. The nozzle assembly 141 is as shown and described in U.S. patent application Ser. No. 11/209,016 which is subject to assignment to the assignee of the present application, and which is incorporated by reference as if fully set forth herein. The nozzle assembly 141 preferably includes a dispensing tube 154, having an exit orifice 173 through an attached nozzle cap 162. The dispensing tube 154 is preferably sealably connected to the hollow body 51 in any suitable manner, for example as described above with regard to the first preferred embodiment or as shown and described in U.S. application Ser. Nos. 11/055,832 and 11/055,915.

The nozzle assembly 141 includes a valve seat 167 connected to the dispensing tube 154. Preferably, the valve seat 167 is integrally formed with the dispensing tube 154. The valve seat 167 includes a port 183 for passing a flow of fluid concentrate/extract 12 through the dispensing tube 154. A valve stem 163 is connected to, and preferably integrally formed with, a valve body 164 forming a valve 160 for alternately covering and uncovering the port 183 in the valve seat 167. A piston 157 is connected to the valve stem 163 opposite the valve body 164 in slideable contact with or slightly spaced apart from the interior surface of the dispensing tube 154 for forcing the concentrate/extract 12 through the port 183. An annular gap 184 between the piston 157 and the dispensing tube 154 permits passing of a flow of the liquid concentrate/extract 12. The gap 184 preferably has a depth which is at least double its width to provide flow resistance at higher piston velocities. An aperture 174 in the piston 157 permits assembly of the piston 157 with the valve stem 163. A spring 165 is disposed between the piston 157 and the valve seat 167 to maintain the valve body 164 in contact with the valve seat 167 and prevent a flow of fluid through the valve port 183. The piston 157 is formed of a ferromagnetic material, such as carbon steel, ferromagnetic stainless steel or iron, to permit actuation by a dispensing actuator 138. Preferably, the dispensing tube 154 and valve seat 167 are formed of a polymer material. The valve 160 and spring 165 are each preferably formed of a suitable non-ferromagnetic material, for example a polymer material or non-ferromagnetic stainless steel.

The orifice 173 of the attached nozzle cap 162 is preferably sized to permit a flow of concentrate/extract to be partially or completely atomized upon exit from the dispensing tube 154. The atomization of the fluid concentrate/extract 12 allows a more complete mixture of concentrate/extract 12 and diluent 14, preventing striping and assuring the mixture delivered to the dispensing area 30 is generally uniform and homogeneous.

According to the second preferred embodiment of the present invention, the dispenser 10 includes the dispensing actuator 138 fixed within the cartridge receiving area 31. The dispensing actuator 138 includes an electromagnet which preferably comprises a magnetic flux focusing ring 177 and a pole piece 179, both made of ferromagnetic material, and a wound coil 176. The configuration of the flux focusing ring 177, pole piece 179 and wound coil 176 provides desirable operation characteristics as described in U.S. patent application Ser. No. 11/209,016. The electromagnet 176 receives current, such as alternating or direct current, from the controller 80. In a preferred embodiment, the controller intermittently provides 24 volts over the coil to produce currents which induce an intermittent magnetic field. The dispensing actuator 138 includes an opening 140 for receiving the dispensing tube 154 of the cartridge 50 therein.

The cartridge 151 dispenses the liquid concentrate/extract 112 as follows. Current is induced in the wound coil 176 by an applied voltage over the coil 176 as provided by the controller 80, causing the piston 157 to be drawn toward the electromagnetic center of the dispensing actuator 138 and against the valve seat 167. The valve body 164, which is fixed to the piston 157, follows in a downward motion with the piston 157 and is displaced from the port 183 in the valve seat 167. During the downward motion of the piston 157, liquid concentrate/extract 12 located between the piston 157 and the valve seat 167 is forced through the port 183, as it is uncovered by the valve body 164, and out through the exit orifice 173, while at the same time, fluid concentrate/extract 12 from the hollow body 51 is drawn into the area above the piston 157 in the dispensing tube 154. As described above, the hollow body 51 is preferably collapsible and collapses to facilitate the extraction of fluid concentrate/extract 12 from the hollow body. Next, the controller 80 cuts off voltage to the actuator 138, causing the piston 157 to move upwardly away from the valve seat 167 by force of the spring 165. During upward motion of the piston 157, fluid concentrate/extract flows from the area above the piston 157 through the annular gap 140 into an area between the piston 157 and the valve seat 167. A voltage, such as the preferred 24 volts direct current producing voltage, or other suitable AC or DC producing voltage, is cycled on and off to provide an intermittent current for repeating the above-described process continuously until a desired amount of the liquid concentrate/extract 12 is dispensed.

Figure 16:
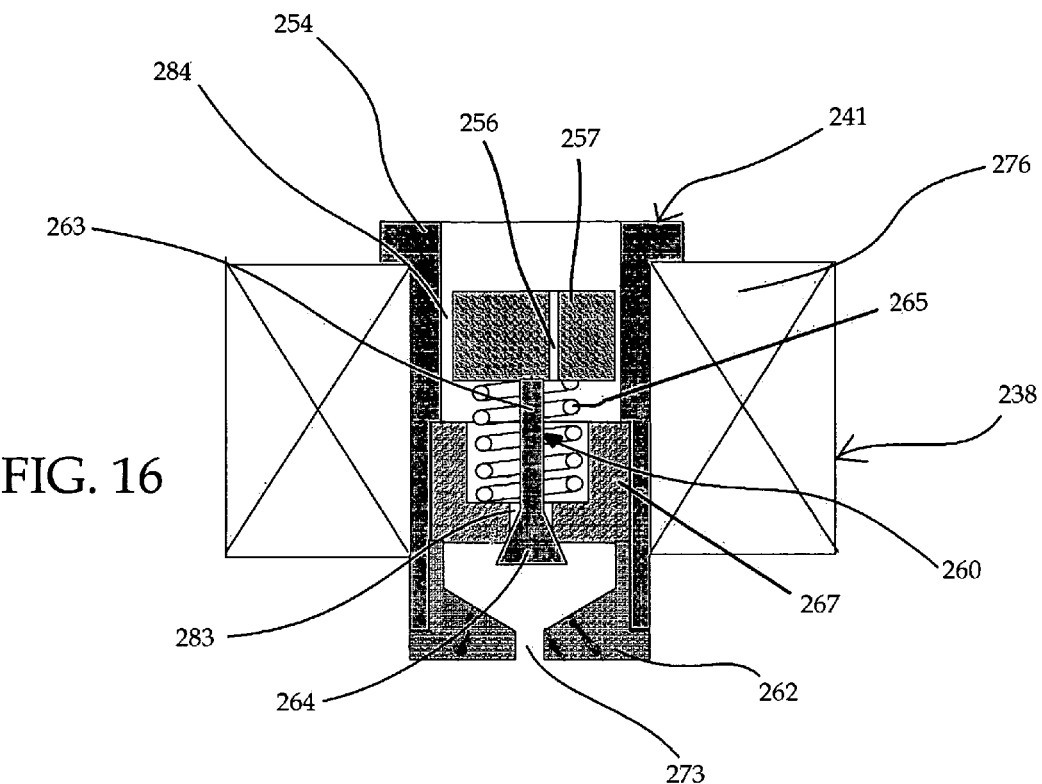
FIGS. 16-17 are cross-sectional views of a nozzle assembly for use in a beverage dispenser according to a third preferred embodiment of the present invention.
Figure 17:
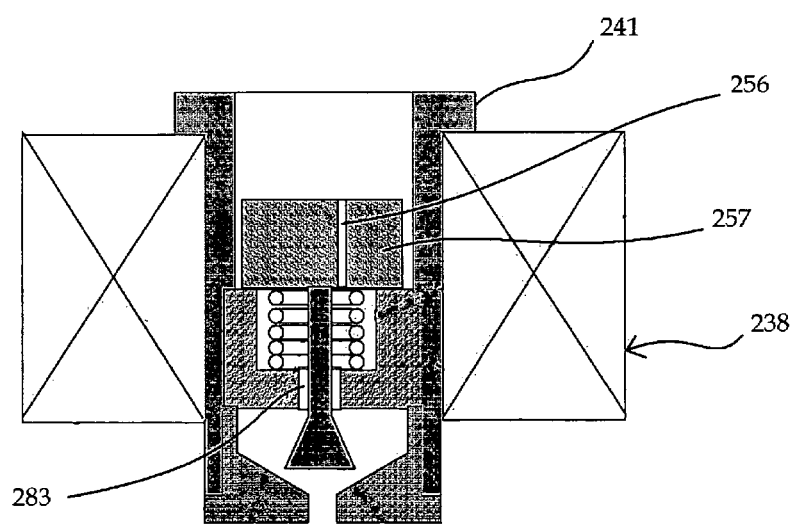
Figure 19:
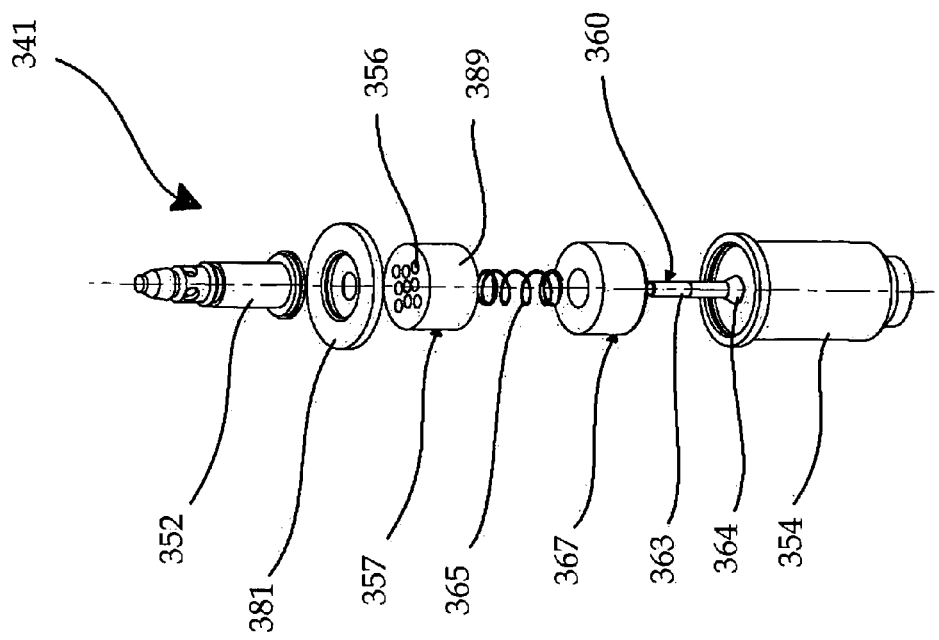
FIG. 19 is an exploded perspective view of the nozzle assembly of FIG. 18.
Figure 18:
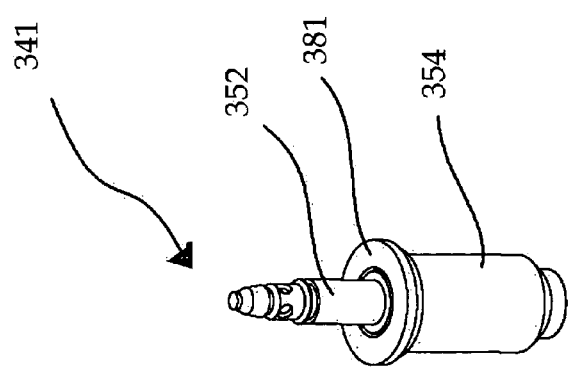
FIG. 18 is a perspective view of a nozzle assembly for use in a beverage dispenser according to a fourth preferred embodiment of the present invention.
Figure 20:
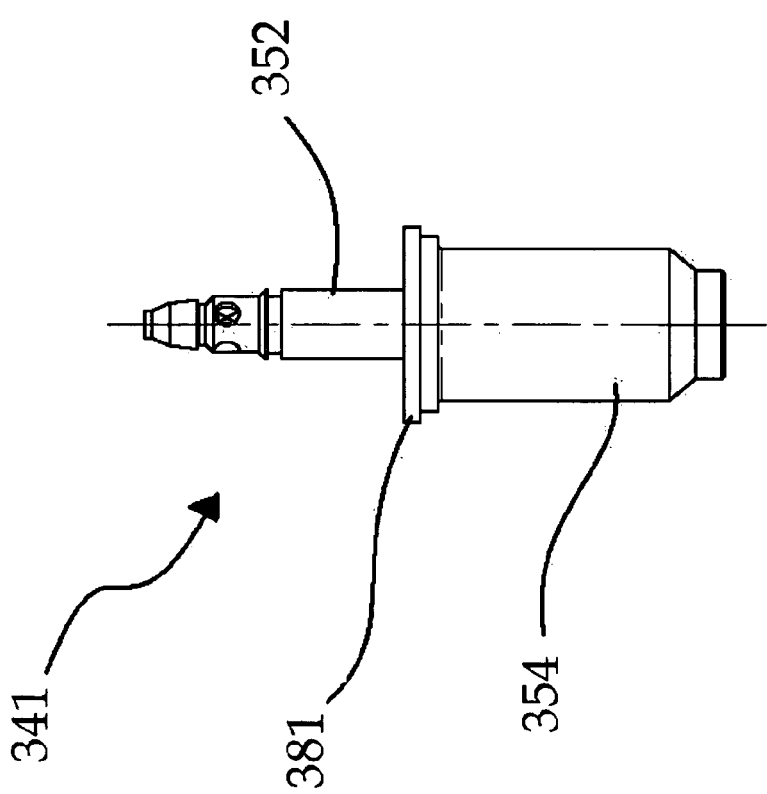
FIG. 20 is an elevational view of the nozzle assembly of FIG. 18.

Referring to FIGS. 16 and 17, a nozzle assembly 241 for use in the dispenser 10 according to a third preferred embodiment of the present invention is shown. The nozzle assembly 241 is as shown and described in U.S. patent application Ser. No. 11/209,016, which is incorporated by reference as if fully set forth herein, and functions in a manner similar to the nozzle assembly 141 described above. The nozzle assembly 241 preferably includes a dispensing tube 254, having an exit orifice 273 through an attached nozzle cap 262. The dispensing tube 254 is preferably sealably connected to the hollow body 51. In this embodiment, the dispenser 10 includes an actuator 238 having an electromagnet with a wound coil 276.

The nozzle assembly 241 includes a valve seat 267 connected to the dispensing tube 254 within a space defined by an interior surface of the dispensing tube 254. The valve seat 267 includes a port 283 for passing a flow of the fluid concentrate/extract 12 through the dispensing tube 254. A valve stem 263 is connected to, and preferably integrally formed with, a valve body 264 forming a valve 260 for alternately covering and uncovering the port 283 in the valve seat 267. A piston 257 is connected to the valve stem 263 opposite the valve body 264 in slideable contact with or slightly spaced apart from the interior surface of the dispensing tube 254 for forcing the concentrate/extract 12 through the port 283. An annular gap 284 between the piston 257 and the dispensing tube 254 and a through aperture 256 permit passing of a flow of the liquid concentrate/extract 12. Each of the gap 284 and the aperture 256 preferably has a depth which is at least double their respective widths to provide flow resistance at higher piston velocities. A spring 265 is disposed between the piston 257 and the valve seat 267 to maintain the valve body 264 in contact with the valve seat 267 and prevent a flow of fluid through the valve port 283. The piston 257 is formed of a ferromagnetic material to permit actuation by the actuator 238. Preferably, the valve seat 267 is also formed of a ferromagnetic material, and accordingly, functions as a pole piece such that when wound coil is charged, magnetic flux generally perpendicular to a bottom surface of the piston 257 is formed. Preferably, the dispensing tube 254 is formed of a polymer material. The valve 260 and spring 265 are each preferably formed of a suitable non-ferromagnetic material, for example a polymer material or non-ferromagnetic stainless steel.

Referring to FIGS. 18-21, a nozzle assembly 341 for use in the dispenser 10 according to a fourth preferred embodiment of the present invention is shown. The nozzle assembly 341 preferably includes a dispensing tube 354, having an exit orifice 373. A top cap 381 is preferably attached to an end of the dispensing tube, and a male locking connector 352 is attached to the top cap 381.

Figure 21:
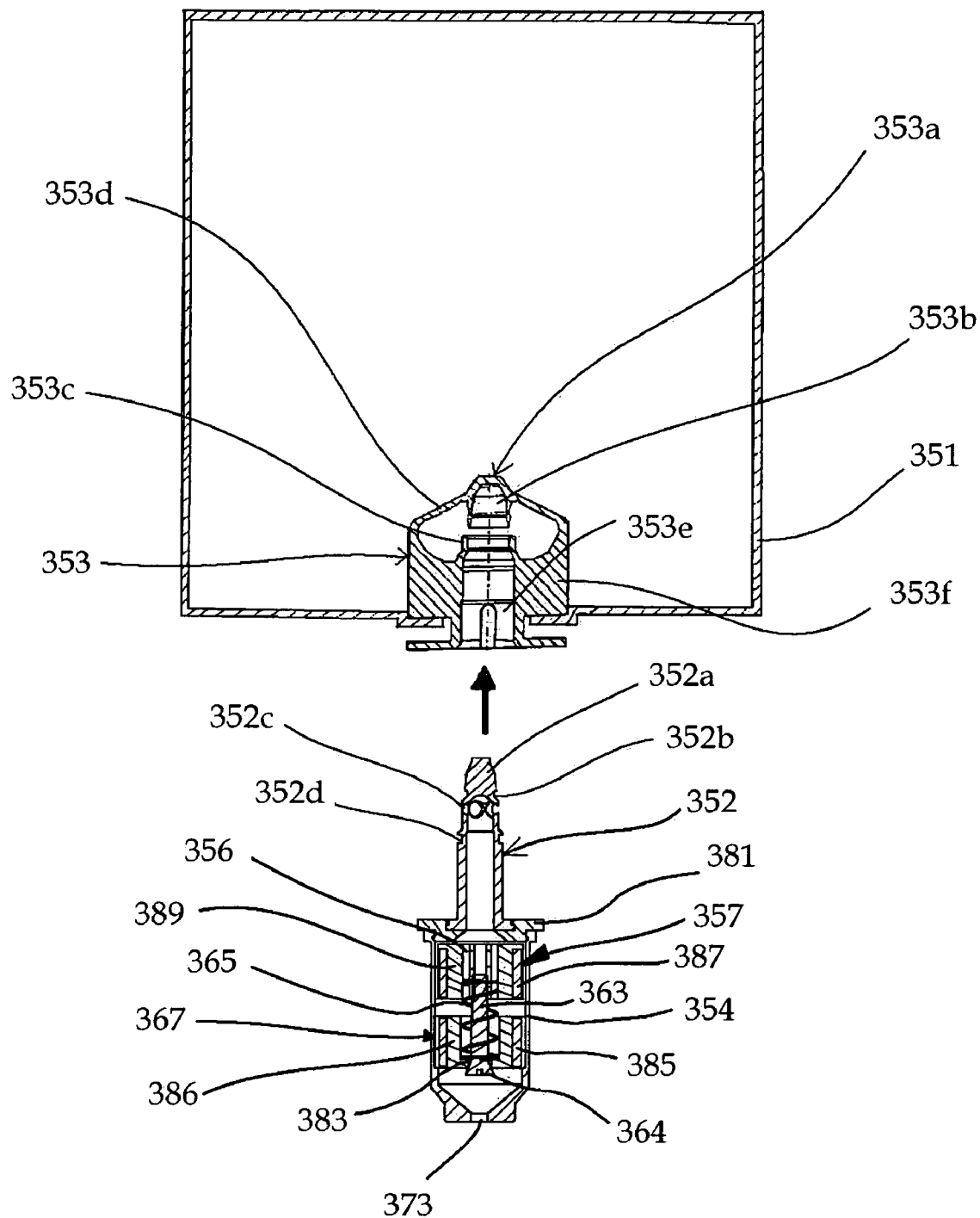
FIG. 21 is a sectional view of a partially disassembled concentrate/extract cartridge according to the fourth preferred embodiment of the present invention.

FIG. 21 shows an unassembled concentrate/extract cartridge 350 including the nozzle assembly 341 and a hollow body 351. The male locking connector 352 preferably includes a conical head 352a, a circumferential groove 352b, cross passages 352c, and a ring shaped groove 352d for retaining a sealing ring. The locking connector 352 is connectable to a female mating connector 353 attached to the hollow body 351. The female mating connector 353 includes a plug 353a with a cavity 353b. The plug 353a is preferably removably or frangibly connected to a seat 353c located at an end of a bore 353e in a body 353f. In use, the male connector 352 is inserted into the bore 353e of the female connector 353 such that the conical head 352a of the male connector 352 enters the cavity 353b of the plug 353a. By inserting the male connector 352, the plug 353a is disconnected from the seat 353c allowing concentrate/extract 12 to flow from the hollow body 351, past flexible bodies 353d, through the cross passages 352c through the body of the connector 352 and into the dispensing tube 354. Locking connectors and mating connectors of the type described above are shown and described in detail in U.S. Pat. Nos. 5,819,986 and 6,126,045, which are incorporated by reference as if fully set forth herein.

The nozzle assembly 341 includes a valve seat 367 connected to the dispensing tube 354 within a space defined by an interior surface of the dispensing tube 354. The valve seat 367 includes a port 383 for passing a flow of fluid concentrate/extract 12 through the dispensing tube 354. A valve stem 363 is connected to, and preferably integrally formed with, a valve body 364 forming a valve 360 for alternately covering and uncovering the port 383 in the valve seat 367. A piston 357 is connected to the valve stem 363 opposite the valve body 364 in slideable contact with or slightly spaced apart from the interior surface of the dispensing tube 354 for forcing concentrate/extract 12 through the port 383. Through apertures 356 in the piston 357 permit passing of a flow of the liquid concentrate/extract 12. A spring 365 is disposed between the piston 357 and the valve seat 367 to maintain the valve body 364 in contact with the valve seat 367 and prevent a flow of fluid through the valve port 383.

Preferably, the valve seat 367 includes a first ferromagnetic material ring 385 encased in a first polymeric shell 386, and preferably the piston 357 includes a second ferromagnetic material ring 387 encased in a second polymeric shell 389. Accordingly, the valve seat 367 functions as a pole piece such that an actuator, for example the actuator 238 of the above-described third preferred embodiment, produces magnetic flux generally perpendicular to a bottom surface of the piston 357. The ferromagnetic material which forms the rings 385, 387 can include carbon steel, ferromagnetic stainless steel or iron. Preferably, the dispensing tube 354 is formed of a polymer material. The valve 360 and spring 365 are each preferably formed of a suitable non-ferromagnetic material, for example a polymer material or non-ferromagnetic stainless steel.

Functional efficiency of the concentrate/extract cartridge 350 of the fourth preferred embodiment (as well as the previously described concentrate/extract cartridges 50, 150, 250 of the first through third preferred embodiments) is dependent in part on the proper sizing of the respective components therein, particularly components involved in pumping operations. Each of the apertures 356 preferably has a depth which is at least double its respective width to provide flow resistance at higher piston velocities. More preferably, each of the apertures 356 has a depth which is 3 to 5 times its respective width. Preferably, a piston flow through area, corresponding to a flow area through the apertures 356 added to a flow area through any annular gap between the outer perimeter of the piston 357 and the interior surface of the dispensing tube 354, is between 20% and 40% percent of a housing flow area, corresponding to the cross-sectional area bound by the circular perimeter of the interior surface of the dispensing tube 354. Also, it is preferred that a port flow through area, corresponding to the cross-sectional area through the port 383 minus the cross-sectional area of the valve stem 363 at the port is between 2% and 4% percent of the housing flow area. Further, it is preferred that an orifice flow through area, corresponding to a flow area through the orifice 373 is between 2% and 4% of the housing flow area. The concentrate/extract cartridge 351 (as well as the cartridges of the other preferred embodiments described above) functions on the basis of fairly complex fluid dynamic relations. Accordingly, the actual dimensions of the components of the nozzle assembly 341 necessarily vary dependent on the type of concentrate/extract, and particularly the viscosity of the concentrate/extract, and the above-noted preferred relations may be less suitable certain fluids or certain scales of the nozzle assembly 341.

A representative preferred example of the nozzle assembly 341 is dimensioned as follows. Preferably, the housing 354 has an inner diameter of between 0.4 inch and 0.6 inch, and more preferably 0.52 inch. The piston 357 preferably has an outer diameter of between 0.3 inch and 0.5 inch and a length of between 0.2 inch and 0.4 inch, and more preferably a diameter of 0.49 inch and a length of 0.31 inch. The apertures 356 preferably have diameters of between 0.06 inch and 0.09 inch, and more preferably alternating diameters of 0.074 inch and 0.082 inch. The port 383 preferably has a diameter of between 0.09 inch and 0.17 inch, and more preferably a diameter of 0.13 inch. The orifice 373 preferably has a diameter of between 0.06 inch and 0.12 inch, and more preferably a diameter of 0.094 inch. The stem 363 preferably has a diameter at the port 383 of between 0.06 inch and 0.12 inch, and more preferably a diameter of 0.094 inch. The first ferromagnetic material ring 385 preferably has a volume of between 0.015 and 0.035 cubic inches, and more preferably has a volume of 0.026 cubic inches. The second ferromagnetic material ring 387 preferably has a volume of between 0.01 and 0.03 cubic inches, and more preferably has a volume of 0.018 cubic inches. The spring 365 preferably has a spring rate of between 0.8 and 1.2 pounds force per inch (lb/in). More preferably, the spring 365 has a spring rate of 0.99 pounds force per inch (lb/in), an outer diameter of 0.203 inch, an inner diameter of 0.179 inch, a free length of 0.5 inch, a wire diameter of 0.012 inch and 5.75 total coils. Due to the factors stated above, the preferred example may not be suitable for dispensing all fluid types, and components of the nozzle assembly 341 may have dimensions outside of the preferred ranges and still maintain functionality.

Figure 22:
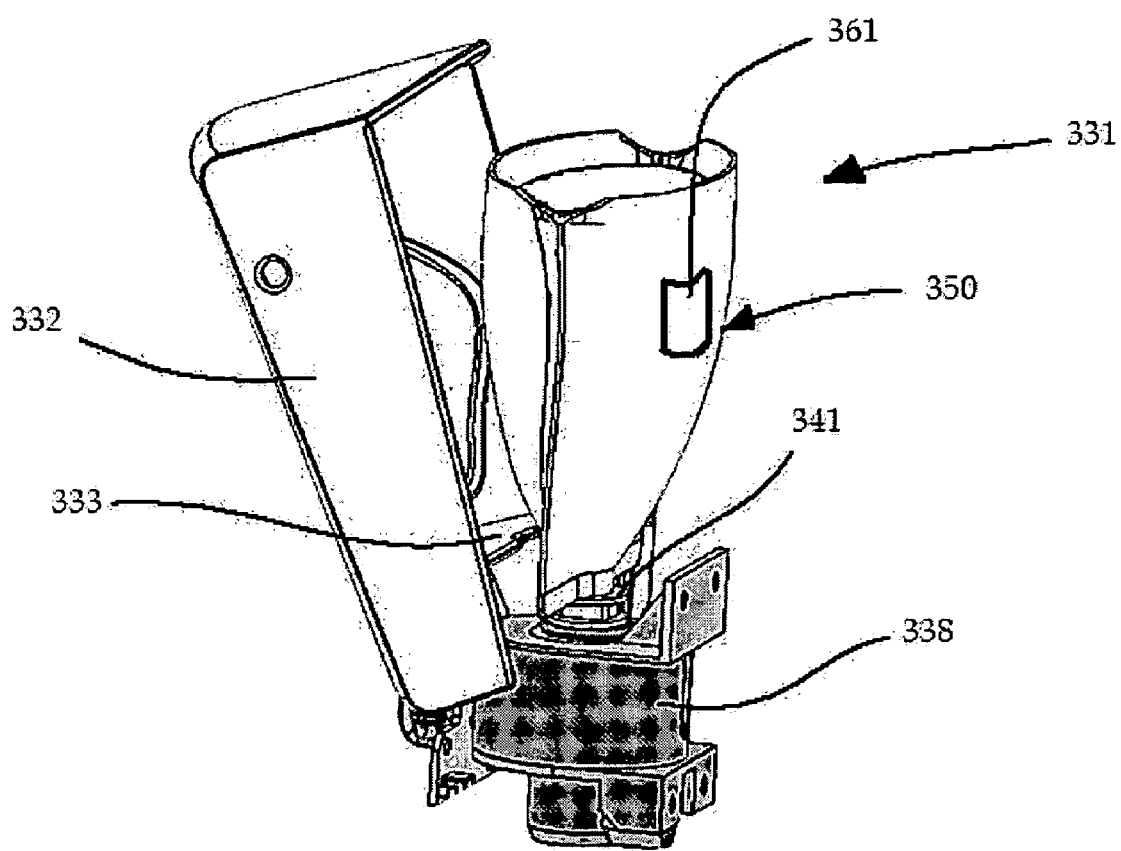
FIG. 22 is a perspective view of a cartridge receiving area of the fourth preferred embodiment of the present invention showing a loading door in an open position.
Figure 23:
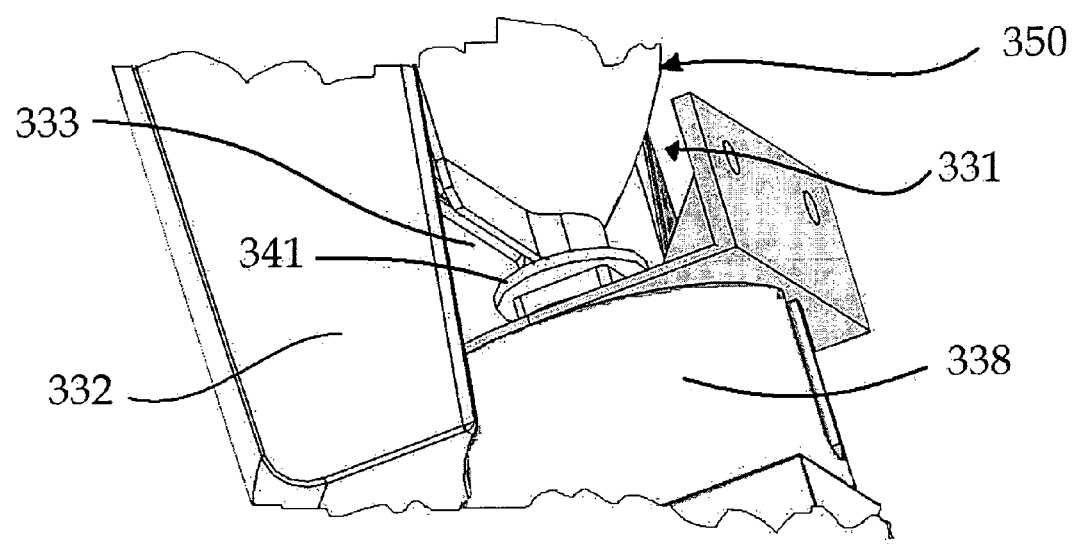
FIG. 23 is a perspective view of a portion of the cartridge receiving area of FIG. 22 showing the loading door in a closed position.

Referring to FIGS. 22 and 23, a cartridge receiving area 331 is shown according to the fourth preferred embodiment of the present invention. In this embodiment, a loading door 332 is pivotably mounted to the dispenser 10 at a bottom portion of the loading door 332, similar to the loading door 32 described above. FIG. 22 shows the loading door 332 in an open position in which the concentrate/extract cartridge 350 having an ID 361 can be loaded into the cartridge receiving area 331 with its nozzle assembly 341 being received in an actuator 338. FIG. 23 shows the door 332 in a closed position in which a retaining plate 333 rigidly attached to the door 332 contacts, or alternatively, resides in close proximity to a top portion of the nozzle assembly 341 to retain the cartridge 350 in position. This configuration prevents the door from being closed when the concentrate/extract cartridge 350 is not properly positioned in the cartridge receiving area 331.

The above described embodiments of the dispenser 10 include a number of functional advantages over many of the known dispensing systems. The concentrate/extract cartridges 50, 150, 250 and 350 allow the dispensing of precise amounts of concentrate/extract and diluent with consistent and reproducible results. The cartridges 50, 150, 250 and 350 include inexpensive components which allow them to be disposable in certain applications. The dispenser 10 can be adapted to hold and dispense a variety of other viscous fluids, besides the aforementioned hot coffee, hot tea and/or hot chocolate, for various applications, for example baby food, fluid condiments, fluid medicine and endless other food and non-food products. Also, the dispenser 10, if desired, could dispense viscous fluids into a container alone, without a diluent, for viscous fluids which do not require dilution. Further, the dispenser 10 could be incorporated into a multitude of other dispensing devices, for example, replaceable bottle office-style hot/cold water dispensers, and home and commercial refrigerators.

While the preferred embodiments of the invention have been described in detail above, the invention is not limited to the specific embodiments described which should be considered as merely exemplary. Further modifications and extensions of the present invention may be developed and all such modifications are deemed to be within the scope of the present invention as defined by the appended claims.

What is claimed is:

1. A concentrate/extract cartridge for a beverage dispenser adapted to dispense a liquid concentrate/extract and a diluent, the cartridge comprising:
   a hollow body;
   a dispensing tube connected to the hollow body:
   a piston slideably contained by an interior surface of the dispensing tube:
   an annular gap between the dispensing tube and the piston for passing a flow of concentrate extract; and
   a valve having a valve stem that passes through a port of a valve seat connected to the dispensing tube, the port defining a flow passage through the dispensing tube, the valve stem being connected to the piston at a first end of the valve stem, and a valve body located at a second end of the valve stem in removable contact with the valve seat, for alternately opening and closing the port.

2. A concentrate/extract cartridge for a beverage dispenser adapted to dispense a liquid concentrate/extract and a diluent, the cartridge comprising:
   a hollow body;
   a dispensing tube connected to the hollow body;
   a male connector connected to the dispensing tube comprising a conical head and at least one cross passage;
   a female connector connected to the hollow body, the female connector comprising a connector body including a seat and a bores which contains at least a portion of the male connector, the female connector further comprising a plug with a cavity which is flexibly connected to the female connector body and is connected to the conical head of the male connector which is at least partially contained by the cavity
   a piston slideably contained by an interior surface of the dispensing tube; and
   a valve having a valve stem that passes through a port of a valve seat connected to the dispensing tube, the port defining a flow passage through the dispensing tube, the valve stem being connected to the piston at a first end of the valve stem, and a valve body located at a second end of the valve stem in removable contact with the valve seat, for alternately opening and closing the port.

3. A beverage dispenser comprising:
   a housing including a dispensing area for dispensing a beverage into a container;
   at least one of a pump and a control valve in communication with a source of diluent which is to be dispensed into the dispensing area;
   a cartridge receiving area in the housing;
   a dispensing actuator located in the housing;
      a concentrate/extract cartridge removably insertable into the cartridge receiving area in a position to be actuated by the dispensing actuator, the concentrate/extract cartridge adapted to hold a beverage concentrate/extract and to dispense the beverage concentrate/extract into the dispensing area upon placement of the concentrate/extract cartridge in the cartridge receiving area and actuation by the actuator, the concentrate/extract container comprising:
      a hollow body:
      a dispensing tube connected to the hollow body:
      a piston slideably contained by an interior surface of the dispensing tube:
      an annular gap between the dispensing tube and the piston for passing a flow of concentrate extract; and
      a valve having a valve stem that passes through a port of a valve seat connected to the dispensing tube, the port defining a flow passage through the dispensing tube, the valve stem being connected to the piston at a first end of the valve stem, and a valve body located at a second end of the valve stem in removable contact with the valve seat, for alternately opening and closing the port; and
   a controller located in the housing to control the actuator to discharge concentrate/extract from the cartridge and to control the at least one of the pump and the control valve to discharge diluent so that the concentrate/extract and diluent are dispensed into the dispensing area;
   wherein the dispensing actuator includes an aperture for removably receiving the dispensing tube of the concentrate/extract cartridge, and the beverage dispenser further comprises a loading door which includes a retaining plate, the loading door being pivotably attached to the housing, wherein in a closed position of the loading door, the retaining plate encloses the dispensing tube within the aperture in the actuator to retain the concentrate/extract cartridge in the housing, and wherein in an open position of the loading door, the concentrate/extract cartridge is removable from the housing.

* * * * *

UNITED STATES PATENT AND TRADEMARK OFFICE
CERTIFICATE OF CORRECTION

| | | |
|---|---|---|
| PATENT NO. | : 7,651,015 B2 | Page 1 of 1 |
| APPLICATION NO. | : 11/266695 | |
| DATED | : January 26, 2010 | |
| INVENTOR(S) | : Girard et al. | |

It is certified that error appears in the above-identified patent and that said Letters Patent is hereby corrected as shown below:

ON THE TITLE PAGE

Title Pg, Item (60), under "Related U.S. Application Data", in Column 1, Line 5, delete "60/770,824" and insert therefor -- 60/700,824 --.

Title Pg, Item (52), under "U.S. Cl.", in Column 2, Line 1, delete "222/54;" and insert therefor -- 222/52; --.

IN THE CLAIMS

In Column 13, Line 35, in Claim 1, delete "body:" and insert therefor -- body; --.

In Column 13, Line 57, in Claim 2, delete "bores" and insert therefor -- bore, --.

In Column 14, Line 2, in Claim 2, delete "cavity" and insert therefor -- cavity; --.

In Column 14, Line 29, in Claim 3, delete "body:" and insert therefor -- body; --.

In Column 14, Line 30, in Claim 3, delete "body:" and insert therefor -- body; --.

In Column 14, Line 32, in Claim 3, delete "tube:" and insert therefor -- tube; --.

Signed and Sealed this
Twenty-ninth Day of November, 2011

David J. Kappos
*Director of the United States Patent and Trademark Office*